United States Patent
Huang et al.

(10) Patent No.: US 12,532,887 B2
(45) Date of Patent: *Jan. 27, 2026

(54) METHOD FOR CONTROLLING PESTS OF POTATO PLANTS

(71) Applicant: BASF SE, Ludwigshafen (DE)

(72) Inventors: Huazhang Huang, Durham, NC (US); Anil Menon, Durham, NC (US)

(73) Assignee: BASF SE, Ludwigshafen (DE)

( * ) Notice: Subject to any disclaimer, the term of this patent is extended or adjusted under 35 U.S.C. 154(b) by 1078 days.

This patent is subject to a terminal disclaimer.

(21) Appl. No.: 17/274,909

(22) PCT Filed: Sep. 19, 2019

(86) PCT No.: PCT/EP2019/075218
§ 371 (c)(1),
(2) Date: Mar. 10, 2021

(87) PCT Pub. No.: WO2020/064511
PCT Pub. Date: Apr. 2, 2020

(65) Prior Publication Data
US 2022/0046924 A1 Feb. 17, 2022

(30) Foreign Application Priority Data

Sep. 28, 2018 (EP) .................................... 18197449

(51) Int. Cl.
*A01N 43/90* (2006.01)
*A01P 7/04* (2006.01)

(52) U.S. Cl.
CPC ................ *A01N 43/90* (2013.01); *A01P 7/04* (2021.08); *A01N 2300/00* (2013.01)

(58) Field of Classification Search
CPC ........ A01N 43/90; A01N 2300/00; A01P 7/04
See application file for complete search history.

(56) References Cited

U.S. PATENT DOCUMENTS

| | | | |
|---|---|---|---|
| 11,578,082 B2 * | 2/2023 | Kwon | C07D 495/04 |
| 11,578,083 B2 * | 2/2023 | Dickhaut | A01N 43/56 |
| 12,144,349 B2 * | 11/2024 | Adisechan | A01N 43/90 |

FOREIGN PATENT DOCUMENTS

| | | | |
|---|---|---|---|
| WO | WO-2014/167084 A1 | 10/2014 | |
| WO | WO-2016/055431 A1 | 4/2016 | |
| WO | WO-2018/177970 A1 | 10/2018 | |
| WO | WO 2020/058010 | * | 3/2020 |

OTHER PUBLICATIONS

International Application No. PCT/EP2019/075218, International Search Report and Written Opinion, mailed Oct. 23, 2019.
International Application No. PCT/EP2019/075185, International Search Report and Written Opinion, mailed Oct. 23, 2019.
European Search Report for EP Patent Application No. 18197449.4, Issued on Nov. 30, 2018, 3 pages.

* cited by examiner

*Primary Examiner* — Kortney L. Klinkel
(74) *Attorney, Agent, or Firm* — MARSHALL, GERSTEIN & BORUN LLP

(57) ABSTRACT

A method for controlling invertebrate pests of potato plants comprises the step of contacting the plant, parts of it, its propagation material, the pests, their food supply, habitat or breeding grounds with one or more compound of formula (I), or a composition thereof.

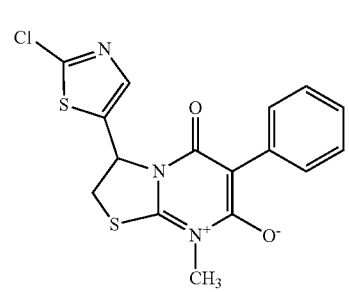

(I)

11 Claims, No Drawings

METHOD FOR CONTROLLING PESTS OF POTATO PLANTS

CROSS-REFERENCE TO RELATED APPLICATIONS

This is the U.S. national phase of International Application No. PCT/EP2019/075218, filed Sep. 19, 2019, which claims the benefit of European Patent Application No. 18197449.4, filed on Sep. 28, 2018.

The invention relates to a method for controlling invertebrate pests of sugarcane, *Citrus*, rapeseed, and potato plants, comprising the step of contacting the plant, parts of it, its propagation material, the pests, their food supply, habitat or breeding grounds with one or more compound of formula I

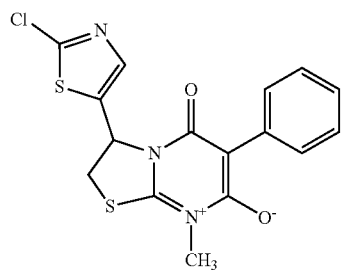 [SMILES: C[n+]1c([O-])c(-c2ccccc2)c(=O)n2c1OCC2c1cnc(Cl)s1]
(I)

or the tautomers, enantiomers, diastereomers or salts thereof.

The compound of formula I is highly suitable for methods for controlling and/or combating invertebrate pests.

It has further been found, that mixtures of the compound of formula (I) with other agriculturally active ingredients, such as insecticides or fungicides or nematicides, are especially suitable for methods for controlling and/or combating invertebrate pests.

The compound of formula (I) is present in two enantiomeric forms I-R-1 and I-S-1 as shown below

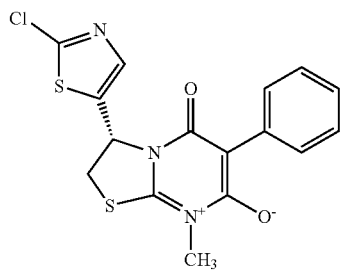
(I-R-1)

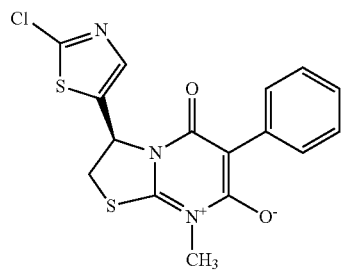
(I-S-1)

The compound of formula (I), is present in mesoionic forms. These forms may be expressed in different isoelectronic formulae, each having the formal positive and negative charges on different atoms (as shown below). The present invention extends to all representative isoelectronic structures of compound of formula I.

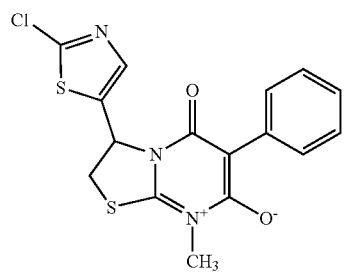

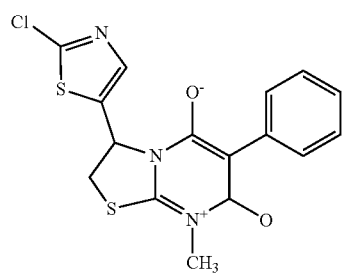

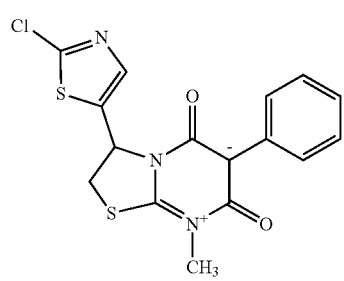

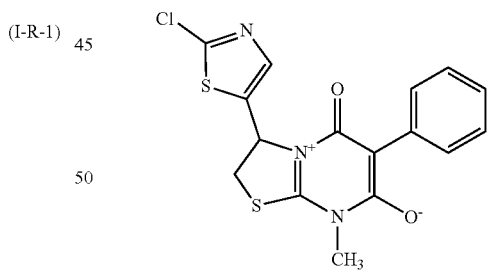

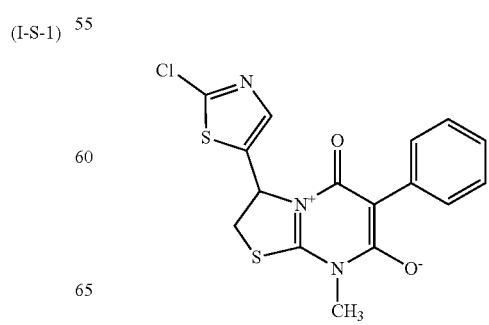

-continued

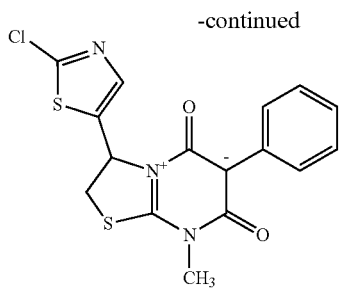

The compounds of the formula I-R-1 and I-S-1 are also present in mesoionic forms analogous to the compound of formula I as shown above.

The invention relates to a method, in which the compound of formula (I) itself and its stereoisomers, salts, enantiomers or N-oxides, especially its enantiomers, and it mixtures.

The term "non-racemic compound of formula (I)" refers to the compound of formula (I) wherein its R- and S-enantiomers are not present in equal amount.

The term "racemic compound of formula (I)" refers to the compound of formula (I) wherein its R- and S-enantiomers are present in equal amount.

The term "Enantiomeric excess" indicates the excess of an enantiomer in a mixture of enantiomers, and is calculated according to the following formula:

$$ee=[|m_1-m_2|/(m_1+m_2)]\times 100\%$$

ee: enantiomeric excess
$m_1$: fraction of enantiomer 1
$m_2$: fraction of enantiomer 2

As used herein and unless otherwise stated, the term "enantiomer" means each individual optically active form of a compound of the invention.

The term "with enantiomeric excess" as used herein refers to a mixture of enantiomers wherein the enantiomer with respect to which the term with "enantiomeric excess" used is present in enantiomeric excess compared to other enantiomer, preferably in an amount of at least 60%, preferably at least 80%, more preferably at least 95%, most preferably at least 98% of the mixture of enantiomers. For example the term "compound of formula I with enantiomeric excess of compound I-R-1" refers to compound of formula I wherein the compound I-R-1 is present in enantiomeric excess amount compared to the compound I-S-1, preferably in an amount of at least 60%, preferably at least 80%, more preferably at least 95%, most preferably at least 98%.

Potatoes are a tuberous crop grown from the perennial plant *Solanum tuberosum*. Potato tubers are specialized stems of the potato plant that form just under the soil surface. It is grown in more than 125 countries and consumed almost daily by more than a billion people. Hundreds of millions of people in developing countries depend on potatoes for their survival. Potatoes are the fourth-most-consumed food crop in the world, after rice, wheat, and corn. However, potato crop is prone to attack by invertebrate pests such as thrips, leafhoppers, aphids, tuber moths etc. Due to different context, potato yield and quality could be affected by different pests causing economic loss.

Many *Citrus* species are cultivated worldwide. Of these species, sweet oranges (*C. sinensis*) and Mandarins (*C. reticulata*) are grown extensively worldwide, and to a more limited extent, grapefruits (*C. paradise*), lemons (*C. limon*) and limes (*C. aurantifolia*) and the hybrids tangelos (mandarin×grapefruit) and tangors (mandarin×sweet orange) (Rajput and Haribabu, 1993). Like most fruits, *Citrus* is a low-caloric food, a good source of carbohydrates and fiber, is low in sodium and fats, and is an excellent source of vitamin C. *Citrus* phytochemicals have potential beneficial properties such as antioxidation, anticancer and ability to lower cholesterol level (Tian et al., 2001). Fruit crop is widely produced and marketed as fresh fruits. However, *Citrus* plants are prone to attack by Arthropod pests such as leafminer, aphids, psyllids, flies, weevils etc. which causes crop damage resulting in great economic loss.

The crop rapeseed, *Brassica napus*, is a winter or spring annual crop in the *Brassica* family. It is also known as rape and oilseed rape. Canola is a genetic variation of rapeseed developed through traditional breeding by Canadian plant breeders. Rapeseed is related to mustard, cabbage, broccoli, cauliflower and turnip. Rapeseed is primarily grown for its oil. Rapeseed is also beneficial as a cover crop and for annual forage. It provides good soil cover over winter to prevent soil erosion, produces large amounts of biomass, suppresses weeds, and can improve soil tilth with its root system. Rapeseed is produced globally, specifically in China, Canada, European and India. Within the vegetable oils, rape oil is very important because of its high oil content of about 40%. Oilseed rape is in third place with 15% of world production indicating the high value of the seeds as a source for oil and animal feed. The increase of world production of vegetable oil has been largely dependent on the greater production of palm oil, oilseed rape and soybean (source: FAO). Rapeseed is prone to attack by range of insect pests, the most important of them being flea beetles, *Phyllotreta* sp and *Psylloides* sp, Pollen beetles, *Meligethes* sp, Cabbage stem, seed weevils, *Ceutorhynchus* sp and Bertha armyworm, *Mamestra* sp. To ensure a healthy crop, it is very important to protect the early stages such as the cotyledons and true leaf stage from pest damage. Seed treatments have been used to control major oilseed rape pests such as flea beetles, cabbage stem flea beetles, potato aphids, etc. Pollen beetle damage during the flowering phase of the crop and the most susceptible stage is the green-yellow buds. Due to widespread pyrethroid resistance to these beetles, and the importance of honeybees as pollinators there is a constant need for effective, bee safe products to control these pests.

Sugarcane is another important crop with the potential to produce sugar, ethanol, biofuel and feed. The global demand for sugar is the primary driver of sugarcane agriculture, with sugarcane accounting for 80% of all the sugar produced. The stem is the essential part of the sugarcane plant and after harvest they are crushed and shredded by rollers to extract the sugar. Sugarcane is currently grown in different regions worldwide. The major sugarcane growing countries include Brazil, India, China, Thailand, USA and Mexico. Sugarcane can be attacked by a variety of pests, examples of such pests are termites, *Odontotermes* sp, shoot borers, *Chilo* sp, *Diatraea* sp, Billbugs, *Sphenophorus* sp, rhizome borer, *Migdolus* sp, spittle bug, *Mahanarva* sp. In Brazil, the burning of the frass after harvesting of sugarcane has been banned due to environmental concerns. Consequently, the spittlebug, *Mahanarva* sp, has now become an important sugarcane pest in Brazil. The nymphs feed on the roots and directly impacts the photosynthesis and other metabolic processes of the sugarcane plant, thereby affecting the quality and yield of the crop. Few options are currently available to control this pest, however there is a constant need to find an effective product to control the pests of sugarcane.

Though there are many insecticides known commercially, the pests pose a significant threat to the cultivation of sugarcane, *Citrus*, rapeseed, and potato crops, and there is thus a need to find alternative insecticides capable of controlling sugarcane, *Citrus*, rapeseed, and potato pests, preferably a more effective insecticide.

Mesoionic compound of formula I showing generally pesticidal activity have been described previously. WO2014167084 describes mesoionic pyridinium compounds, their preparation and their use as pest control agents.

However, their surprisingly excellent applicability in sugarcane, *Citrus*, rapeseed, and potato plants/crops, and their extraordinary activity against sugarcane, *Citrus*, rapeseed, or potato crop pests, especially in combination with other agricultural active ingredients have not been described previously.

The compound of formula I according to the invention can be prepared analogously to the methods described in WO2014/167084. The preparation of the compounds of formula (I) above may lead to them being obtained as isomer mixtures. If desired, these can be resolved by the methods customary for this purpose, such as crystallization or chromatography, also on optically active adsorbate, to give the pure isomers.

Agronomically acceptable salts of the compounds I can be formed in a customary manner, e.g. by reaction with an acid of the anion in question.

Compounds of formula (I) can be prepared analogously to the methods described by Holyoke et al. in WO 2009/099929 (Scheme 1), from appropriately substituted compounds (III).

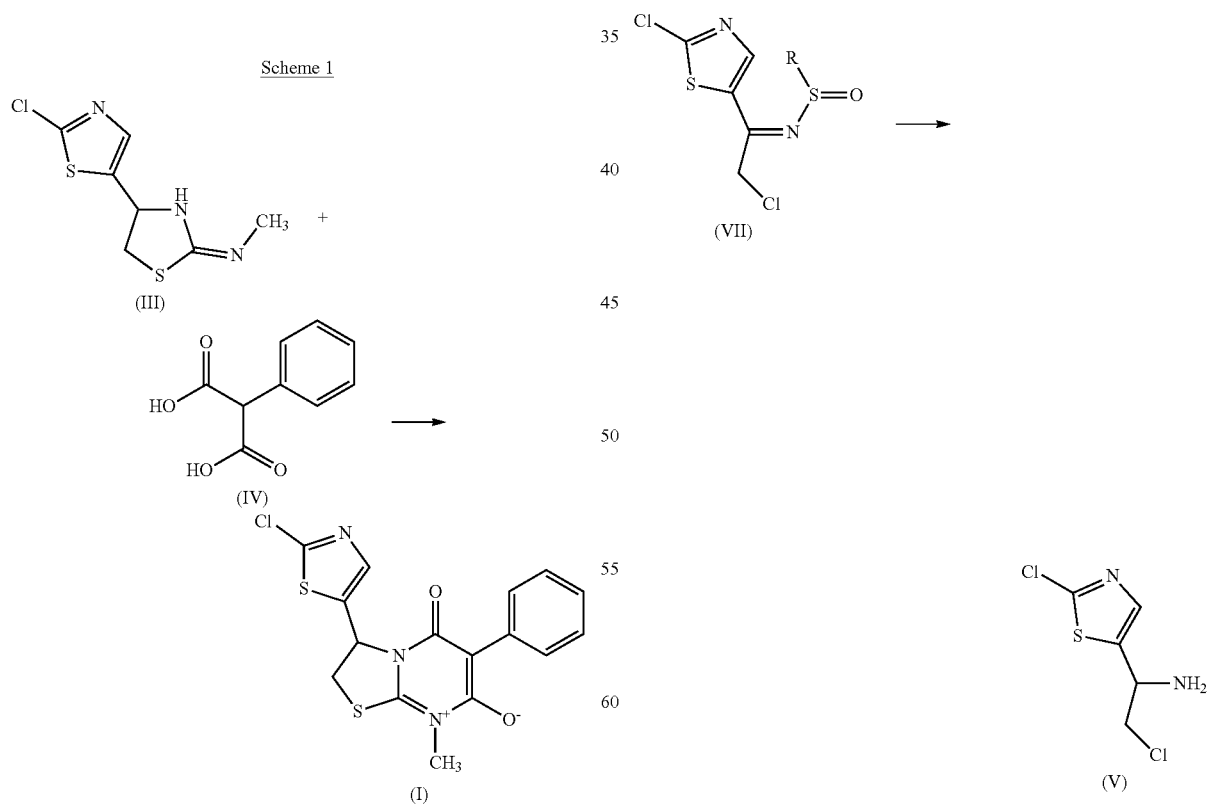

Compounds (III) can be prepared by methods described e.g. by Brian R. Dixon et al in U.S. Pat. No. 6,353,006 from e.g. 2-chloro ethanamines like compound (V), and analogous methods thereto, with appropriately substituted reactants.

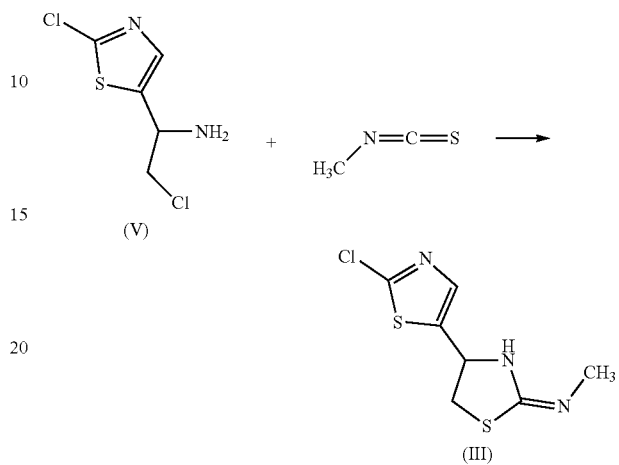

2-Chloro ethanamines compounds (V) in turn are available for example by reduction of sulfinylimines as exemplified in Denolf, Bram et al, Journal of Organic Chemistry, 72(9), 3211-3217; 2007.

Compounds (VII) are obtained from α-halo-ketones, which are well known to persons skilled in the art.

The compound of formula I with enantiomeric excess/enantiomeric purity of I-R-1 can be prepared by method comprising at least the steps of:

(A) reacting a compound of formula III,

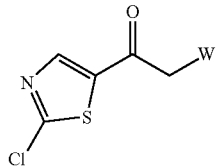
III wherein
W is halogen, O-p-toluenesulfonyl, O-methanesulfonyl, or O-trifluoromethanesulfonyl;
with $M^2OR^{AC}$ wherein $M^2$ is selected from lithium, sodium, potassium, aluminium, barium, caesium, calcium, and magnesium; $R^{AC}$ is C(=O)—$C_1$-$C_4$-alkyl;
to obtain the compound of formula IV,

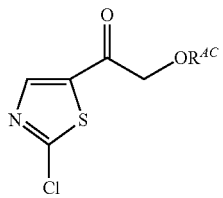
IV wherein Het and $R^{AC}$ are as defined herein;

(B) hydrolyzing the compound of formula IV as defined herein, in the presence of an acid or a base, to obtain a compound of formula V,

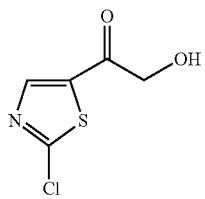
V wherein Het is as defined in compound of formula IV;

(C) reacting the compound of formula V with $X^2SO_2NH_2$ wherein $X^2$ is halogen, to obtain the compound of formula VI

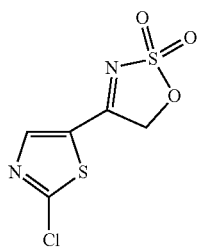
VI (D) hydrogenation of the compound of formula VI,
in the presence of a hydrogenation catalyst MXLn,
wherein
M is a transition metal from group VIII to group XII of the periodic table;
X is an anion;
Ln is Ln1 or Ln2,
wherein
Ln1 is a chiral ligand of the formula Ln1

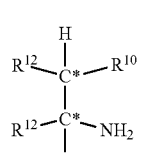
Ln1 wherein
C* is an asymmetric carbon atom of S or R-configuration;
$R^{10}$ is OH or NH—$SO_2$—$R^{11}$; wherein
$R^{11}$ is aryl unsubstituted or substituted with halogen, $C_1$-$C_{10}$-alkyl, $C_1$-$C_4$-alkoxy, $C_3$-$C_6$-cycloalkyl, $SO_3H$, or $SO_3Na$, or
$C_1$-$C_{10}$-perfluoroalkyl, or $R^{13}R^{14}N$ wherein $R^{13}$ and $R^{14}$ independently represent $C_1$-$C_{10}$-alkyl unsubstituted or substituted with $C_6$-$C_{10}$-aryl, or $R^{13}$ and $R^{14}$ represent a $C_6$-$C_{10}$-cycloalkyl;
$R^{12}$ independently represents aryl or $C_6$-$C_{10}$-cycloalkyl ring, wherein the ring is unsubstituted or substituted independently of each other with halogen, $C_1$-$C_{10}$-alkyl, $C_1$-$C_4$-alkoxy, $C_3$-$C_6$-cycloalkyl, $SO_3H$, or $SO_3Na$, or both $R^{12}$ are linked together to form a 3- to 6-membered carbocyclic ring or a 5- to 10-membered partially unsaturated carbocyclic ring;
Ln2 is a chiral phosphorous ligand;
and a hydrogen source selected from a) mixture of $N(R)_3$, wherein R is H or $C_1$-$C_6$-alkyl, and HCOOH, b) HCOONa, and c) mixture of isopropyl alcohol, and t-BuOK or t-BuONa or t-BuOLi;
to obtain a compound of formula VII

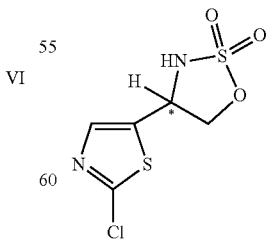
VII wherein
C* is an asymmetric carbon atom of S or R-configuration;

(E) reacting the compound of formula VII,

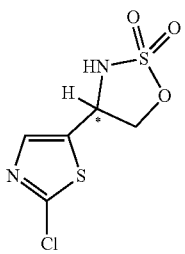

VII wherein
C* is an asymmetric carbon atom of S or R-configuration; with CH$_3$NCS;
in the presence of a base,
to obtain a compound of formula VIII,

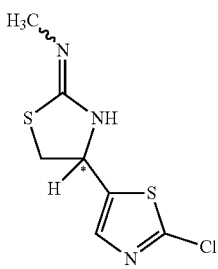

VIII (F) reacting the compound of formula VIII as defined herein, with a compound of formula IX

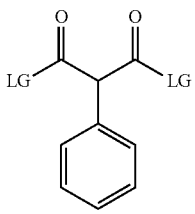

IX wherein,
LG is a leaving group selected from halogen, OR$^u$ or SR$^u$; wherein
R$^u$ is halogen, C$_1$-C$_6$-alkyl or aryl, which is unsubstituted or substituted with halogen;
to obtain the compound of formula I with enantiomeric excess as defined herein.

However, although the mesoionic compounds and its combined application with other insecticides are known to have shown activity against certain crop damaging insect pests, none of these documents disclose an acceptable efficacy of the compound of formula I or the compound of formula (I) with enantiomeric excess of the compound I-R-1 or the compound I-R-1, and some of their selected mixtures with other pesticidally active compounds against typical pests of sugarcane, Citrus, rapeseed, and potato; preferably genetically modified plants, preferably by drench or foliar application method.

Moreover, the present invention relates to and includes the following embodiments:

a method for controlling or combating pest invertebrates of sugarcane, Citrus, rapeseed, and potato, infestation, or infection by pest invertebrates, which method comprises contacting said pest or its food supply, habitat or breeding grounds with the compound of formula (I) or the compound of formula (I) with enantiomeric excess of the compound of formula I-R-1 or the compound I-R-1, as defined above and herein below, or a composition comprising at least one compound of formula (I) or the compound of formula (I) with enantiomeric excess of compound of formula I-R-1 or the compound I-R-1;

a method for controlling or combating pest invertebrates of sugarcane, Citrus, rapeseed, and potato, infestation, or infection by pest invertebrates, which method comprises contacting or treating the plants, plant propagation material and growing sugarcane, Citrus, rapeseed, and potato plants, or soil, material, surface, space, area or water in which the plants, plant propagation material is stored or the plant is growing (plant locus), with a pesticidally effective amount of the compound of formula (I) or the compound of formula (I) with enantiomeric excess of compound of formula I-R-1 or the compound I-R-1, as defined above and herein below, or a composition comprising at least one compound of formula (I) or the compound of formula (I) with enantiomeric excess of compound of formula I-R-1 or the compound I-R-1;

a method for protecting sugarcane, Citrus, rapeseed, and potato against pest invertebrates comprising contacting the sugarcane, Citrus, rapeseed, and potato pest invertebrates, or their food supply, habitat or breeding grounds with pesticidally effective amount of the compound of formula (I), or the compound of formula (I) with enantiomeric excess of compound of formula IR-1, as defined above, or a composition comprising at least one compound of formula (I) or or a composition comprising at least one compound of formula (I) or the compound of formula (I) with enantiomeric excess of compound of formula I-R-1 or the compound I-R-1, as defined above and herein below;

a method for protecting sugarcane, Citrus, rapeseed, and potato plants, their plant propagation material and/or growing sugarcane, Citrus, rapeseed, and potato plants from the attack or infestation by pest invertebrates comprising contacting or treating the plants, plant propagation material and growing sugarcane, Citrus, rapeseed, and potato plants, or soil, material, surface, space, area or water in which the plants, plant propagation material is stored or the plant is growing (plant locus), with a pesticidally effective amount of the compound of formula (I) or the compound of formula (I) with enantiomeric excess of compound of formula I-R-1 or the compound I-R-1, as defined above and herein below, or a composition comprising at least one compound of formula (I) or the compound of formula (I) with enantiomeric excess of compound of formula I-R-1 or the compound I-R-1;

Use of the compounds of formula (I), or the compound of formula (I) with enantiomeric excess of compound of formula I-R-1, or the compound I-R-1, or a composition comprising at least one compound of formula (I) or the compound of formula (I) with enantiomeric excess of compound of formula I-R-1 or the compound I-R-1, for protecting growing sugarcane, Citrus, rapeseed, or potato plant, the plant propagation material from attack or infestation by sugarcane, Citrus, rapeseed, and potato pest invertebrates;

Use of the compounds of formula (I), or the non-racemic compounds of the formula (I), or the compound of formula (I) with enantiomeric excess of compound of formula I-R-1 or the compound I-R-1, or a composition comprising at least one compound of formula (I) or the compound of formula (I) with enantiomeric excess of compound of formula I-R-1 or the compound I-R-1, for controlling invertebrate pests of sugarcane, *Citrus*, rapeseed, or potato plant, Moreover, the present invention relates to and includes the following embodiments:

a method for controlling or combating pest invertebrates of potato, infestation, or infection by pest invertebrates, which method comprises contacting said pest or its food supply, habitat or breeding grounds with the compound of formula (I) or the compound of formula (I) with enantiomeric excess of the compound of formula I-R-1 or the compound I-R-1, as defined above and herein below, or a composition comprising at least one compound of formula (I) or the compound of formula (I) with enantiomeric excess of compound of formula I-R-1 or the compound I-R-1;

a method for controlling or combating pest invertebrates of potato, infestation, or infection by pest invertebrates, which method comprises contacting or treating the plants, plant propagation material and growing potato plants, or soil, material, surface, space, area or water in which the plants, plant propagation material is stored or the plant is growing (plant locus), with a pesticidally effective amount of the compound of formula (I) or the compound of formula (I) with enantiomeric excess of compound of formula I-R-1 or the compound I-R-1, as defined above and herein below, or a composition comprising at least one compound of formula (I) or the compound of formula (I) with enantiomeric excess of compound of formula I-R-1 or the compound I-R-1;

a method for protecting potato against pest invertebrates comprising contacting the potato pest invertebrates, or their food supply, habitat or breeding grounds with pesticidally effective amount of the compound of formula (I), or the compound of formula (I) with enantiomeric excess of compound of formula I-R-1, as defined above, or a composition comprising at least one compound of formula (I) or or a composition comprising at least one compound of formula (I) or the compound of formula (I) with enantiomeric excess of compound of formula I-R-1 or the compound I-R-1, as defined above and herein below;

a method for protecting potato plants, their plant propagation material and/or growing potato plants from the attack or infestation by pest invertebrates comprising contacting or treating the plants, plant propagation material and growing potato plants, or soil, material, surface, space, area or water in which the plants, plant propagation material is stored or the plant is growing (plant locus), with a pesticidally effective amount of the compound of formula (I) or the compound of formula (I) with enantiomeric excess of compound of formula I-R-1 or the compound I-R-1, as defined above and herein below, or a composition comprising at least one compound of formula (I) or the compound of formula (I) with enantiomeric excess of compound of formula I-R-1 or the compound I-R-1;

Use of the compounds of formula (I), or the compound of formula (I) with enantiomeric excess of compound of formula I-R-1, or the compound I-R-1, or a composition comprising at least one compound of formula (I) or the compound of formula (I) with enantiomeric excess of compound of formula I-R-1 or the compound I-R-1, for protecting growing potato plant, the plant propagation material from attack or infestation by potato pest invertebrates;

Use of the compounds of formula (I), or the non-racemic compounds of the formula (I), or the compound of formula (I) with enantiomeric excess of compound of formula I-R-1 or the compound I-R-1, or a composition comprising at least one compound of formula (I) or the compound of formula (I) with enantiomeric excess of compound of formula I-R-1 or the compound I-R-1, for controlling invertebrate pests of potato plant, In one embodiment of the invention, the compound of formula I is non-racemic;

In another embodiment of the invention, the compound of formula I is the compound I-R-1;

In another embodiment of the invention, the compounds of formula (I) refer to the compound of formula (I) with enantiomeric excess of the compound I-R-1;

In another embodiment of the invention, the compounds of formula (I) refer to the compound of formula (I) with enantiomeric excess of at least 55% of the compound I-R-1;

In another embodiment of the invention, the compounds of formula (I) refer to the compound of formula (I) with enantiomeric excess of at least 60% of the compound I-R-1;

In another embodiment of the invention, the compounds of formula (I) refer to the compound of formula (I) with enantiomeric excess of at least 65% of the compound I-R-1;

In another embodiment of the invention, the compounds of formula (I) refer to the compound of formula (I) with enantiomeric excess of at least 70% of the compound I-R-1;

In another embodiment of the invention, the compounds of formula (I) refer to the compound of formula (I) with enantiomeric excess of at least 75% of the compound I-R-1;

In another embodiment of the invention, the compounds of formula (I) refer to the compound of formula (I) with enantiomeric excess of at least 80% of the compound I-R-1;

In another embodiment of the invention, the compounds of formula (I) refer to the compound of formula (I) with enantiomeric excess of at least 85% of the compound I-R-1;

In a preferred embodiment of the invention, the compounds of formula (I) refer to the compound of formula (I) with enantiomeric excess of at least 90% of the compound I-R-1;

In another preferred embodiment of the invention, the compounds of formula (I) refer to the compound of formula (I) with enantiomeric excess of at least 95% of the compound I-R-1;

In another preferred embodiment of the invention, the compounds of formula (I) refer to the compound of formula (I) with enantiomeric excess of at least 98% of the compound I-R-1;

In another preferred embodiment of the invention, the compounds of formula (I) refer to the compound of formula (I) with enantiomeric excess of at least 99% of the compound I-R-1;

In one embodiment of the invention, the compounds of formula (I) refer to the compound of formula (I) with enantiomeric excess of the compound I-R-1, wherein the compound I-R-1 is present in an amount from $\geq 55\%$ to $\leq 100\%$ and the compound I-S-1 is present in an amount from $\leq 45\%$ to $\geq 0\%$;

In another embodiment of the invention, the compounds of formula (I) refer to the compound of formula (I) with enantiomeric excess of the compound I-R-1, wherein the the compound I-R-1 is present in an amount from ≥60% to ≤100% and the compound I-S-1 is present in an amount from ≤40% to ≥0%;

In another embodiment of the invention, the compounds of formula (I) refer to the compound of formula (I) with enantiomeric excess of the compound I-R-1, wherein the the compound I-R-1 is present in an amount from ≥65% to ≤100% and the compound I-S-1 is present in an amount from ≤35% to ≥0%;

In another embodiment of the invention, the compounds of formula (I) refer to the compound of formula (I) with enantiomeric excess of the compound I-R-1, wherein the the compound I-R-1 is present in an amount from ≥70% to ≤100% and the compound I-S-1 is present in an amount from ≤30% to ≥0%;

In another embodiment of the invention, the compounds of formula (I) refer to the compound of formula (I) with enantiomeric excess of the compound I-R-1, wherein the the compound I-R-1 is present in an amount from ≥75% to ≤100% and the compound I-S-1 is present in an amount from ≤25% to ≥0%;

In another embodiment of the invention, the compounds of formula (I) refer to the compound of formula (I) with enantiomeric excess of the compound I-R-1, wherein the the compound I-R-1 is present in an amount from ≥30% to ≤100% and the compound I-S-1 is present in an amount from ≤20% to ≥4%;

In another embodiment of the invention, the compounds of formula (I) refer to the compound of formula (I) with enantiomeric excess of the compound I-R-1, wherein the the compound I-R-1 is present in an amount from ≥35% to ≤100% and the compound I-S-1 is present in an amount from ≤15% to ≥4%;

In another embodiment of the invention, the compounds of formula (I) refer to the compound of formula (I) with enantiomeric excess of the compound I-R-1, wherein the the compound I-R-1 is present in an amount from ≥90% to ≤100% and the compound I-S-1 is present in an amount from ≤10% to ≥4%;

In another embodiment of the invention, the compounds of formula (I) refer to the compound of formula (I) with enantiomeric excess of the compound I-R-1, wherein the the compound I-R-1 is present in an amount from ≥95% to ≤100% and the compound I-S-1 is present in an amount from ≤5% to ≥4%;

In another embodiment of the invention, the compounds of formula (I) refer to the compound of formula (I) with enantiomeric excess of the compound I-R-1, wherein the the compound I-R-1 is present in an amount from ≥98% to ≤100%, preferably ≥49% to ≤100%, and the compound I-S-1 is present in an amount from ≤2% to ≥4%, preferably ≤1% to ≥4%;

The "compound of formula I", "compound/s I", "compound of formula I-R-1", or "compound of formula I with enantiomeric excess of compound I-R-1", and the terms "compound(s) for methods according to the (present) invention", "compound(s) according to the (present) invention" or which all compound(s) are applied in methods and uses according to the present invention comprise the compound(s) as defined herein as well as a known stereoisomer, salt, tautomer or N-oxide thereof (including a polymorphic crystalline form, a co-crystal or a solvate of a compound or a stereoisomer, salt, tautomer or N-oxide thereof).

The compounds according to the invention may be amorphous or may exist in one or more different crystalline states (polymorphs) which may have different macroscopic properties such as stability or show different biological properties such as activities. The present invention relates to amorphous and crystalline compounds according to the invention, mixtures of different crystalline states of the respective compounds according to the invention, as well as amorphous or crystalline salts thereof.

Salts of the compounds according to the invention are preferably agriculturally and/or veterinary acceptable salts, preferably agriculturally acceptable salts. They can be formed in a customary manner, e.g. by reacting the compound with an acid of the anion in question if the compounds according to the invention have a basic functionality or by reacting acidic compounds according to the invention with a suitable base.

Agriculturally useful salts of the compounds according to the invention encompass especially the acid addition salts of those acids whose cations and anions, respectively, have no adverse effect on the pesticidal action of the compounds according to the invention.

Suitable cations are in particular the ions of the alkali metals, preferably Li, Na and K, of the alkaline earth metals, preferably Ca, Mg and Ba, and of the transition metals, preferably Mn, Cu, Zn and Fe, and also ammonium ($NH_4^+$) and substituted ammonium in which one to four of the H atoms are replaced by $C_1$-$C_4$-alkyl, $C_1$-$C_4$-hydroxyalkyl, $C_1$-$C_4$-alkoxy, $C_1$-$C_4$-alkoxy-$C_1$-$C_4$-alkyl, hydroxy-$C_1$-$C_4$-alkoxy-$C_1$-$C_4$-alkyl, phenyl or benzyl. Examples of substituted ammonium ions comprise methylammonium, isopropylammonium, dimethylammonium, diisopropylammonium, trimethylammonium, tetramethylammonium, tetraethylammonium, tetrabutylammonium, 2-hydroxyethylammonium, 2-(2-hydroxyethoxy)ethyl-ammonium, bis(2-hydroxyethyl)ammonium, benzyltrimethylammonium and benzyltriethylammonium, furthermore phosphonium ions, sulfonium ions, preferably tri($C_1$-$C_4$-alkyl)sulfonium, and sulfoxonium ions, preferably tri($C_1$-$C_4$-alkyl)sulfoxonium.

Anions of useful acid addition salts are primarily chloride, bromide, fluoride, hydrogensulfate, sulfate, dihydrogenphosphate, hydrogenphosphate, phosphate, nitrate, bicarbonate, carbonate, hexafluorosilicate, hexafluorophosphate, benzoate, and the anions of $C_1$-$C_4$-alkanoic acids, preferably formate, acetate, propionate and butyrate. They can be formed by reacting compounds according to the invention with an acid of the corresponding anion, preferably of hydrochloric acid, hydrobromic acid, sulfuric acid, phosphoric acid or nitric acid.

The term "N-oxide" includes any compound of the present invention which has at least one tertiary nitrogen atom that is oxidized to an N-oxide moiety.

The term "genetically modified plant" refers to a plant in which the genetic material has been altered in a way that does not occur naturally by mating and/or natural recombination.

Further preferred embodiments of the present invention are described below,

In one preferred embodiment of the invention, the plants/crops are selected from the family of Poaceae e.g sugarcane, family of Rutaceae e.g. *Citrus*, family of Brassicaceae e.g. rapeseed, and family of Solanaceae e.g. potato;

In another preferred embodiment of the invention, the plants/crops are selected from sugarcane, *Citrus*, rapeseed, and potato;

In another preferred embodiment of the invention, the plants/crops are selected from *Citrus*, rapeseed, and potato;

In another preferred embodiment of the invention, the plants/crops are selected from sugarcane, rapeseed, and potato;

In another preferred embodiment of the invention, the plants/crops are selected from sugarcane, *Citrus*, and potato;

In another preferred embodiment of the invention, the plants/crops are selected from sugarcane, *Citrus*, and rapeseed;

In another preferred embodiment of the invention, the plants/crop is sugarcane;

In another preferred embodiment of the invention, the plants/crop is *Citrus*; preferably plants selected from oranges, mandarins, lemons, grapefruit, pomelo and limes;

In another preferred embodiment of the invention, the plants/crop is rapeseed;

In another preferred embodiment of the invention, the plants/crop is potato;

In the context of this invention, pest invertebrates are animal pests, which occur in sugarcane, *Citrus*, rapeseed, and potato. The pest invertebrates include insects, acarids and nematodes, preferably insects. Pest invertebrates, which are well-known in sugarcane, *Citrus*, rapeseed, and potato, include but are not limited to the following species:

*Abacarus sacchari, Acigona steniellus, Aleurolobus barodensis, Cavelerius excavatus, Ceratovacuna lanigera, Chilo* sp such as *Chilo auricillus, Chilo infescatellus, Chilo partellus, Chilo saccharifagus indicus, Chilo terrenellus, Chilo tumidicostaks, Conoderus* sp, *Coptotermes heimi, Diaprepes abbreviatus, Diatraea* sp such as *Diatraea saccharalis, Elasmopalpus* sp such as *Elasmopalpus lignosellus, Eldana saccharina, Emmalocera depresella, Fulmekiola serrata, Haplothrips* sp, *Hoplolaimus indicus, Leptodictya tabida, Mahanarva* sp such as *Mahanarva fimbriolata, Melanaphis sacchari, Melanaspis glomerata, Melanaspis glomerate, Melanotus communis, Meloidogyne javanica, Metamasius hemipterous, Migdolus* sp such as *Migdolus fryanus, Miscrotermes obesi, Myasmia trapezalis, Odontotermes* sp such as *Odontotermes assmuthi, O wallonensis, O. obesus, Oligonychus stickneyl, Schizotetranychus* sp, *Perkinsiella saccharicida, Perkinsiella vastatrix, P. vitiensis, Pipersia sacchan, Polyocha depressella, Pratylenchus* spp, *Pyrilla purpusilla, Rhabdoscelus obscurus, Rotylenchulus reniformis, Saccharosydne saccharivora, Schistocerca americana, Scirpophaga excerptalis, Sesamia grisescens, Sesamia inferens, Sipha flava, Sphenophorus* sp such as *Sphenophorus levis, Tomarus subtropicus, Trinervitermes bifomis, Tryporyza nivella, Agrotis Ipsilon, Athalia rosae, Autographia californica, Brevicoryne brassicae, Ceutorhynchus* sp such as *Ceutorhynchus assimilis, Ceutorhynchus napi, Ceutorhynchus obstrictus, Ceutorhynchus pallidactylus, Ceutorhynchus picitarsis, Ceutorhynchus quadridens, Contarinia nasturtil, Dasineura brassicae, Delia brassicae, Dicestra trifoli, Entomosceks americana, Lygus* spp., *Mamestra* sp such as *Mamestra configurata, Meligethes* sp such as *Meligethes aeneus, Meligethes viridescens, Phyllotreta* spp, *Phyllotreta cruciferae, Phyllotreta memorum, Phyllotreta undulata, Phyllotreta diademata Phyllotreta striolata, Phytomyza rufipes, Pieris* sp., *Plutella xylostella, Psylliodes* sp such as *Psylliodes chrysocephala, Psylliodes punctulata, Vanessa cardui, Aleurothrbos floccosus, Amorbia cuneana, Anacamptodes fraglaria, Aonidiella aurantii, Aonidiella citrina, Aphis* sp such as *Aphis fabae, Aphis frangulae, Aphis nasturtii, Aphis gossypii, Aphis spiraecola, Archis argyrospilam, Argyrotaenia (=citrana) franciscan, Brevipalpus* sp such as *Brevipalpus lewisi, Caliothrips fasciatus, Cantareus asperses, Ceroplastes floridensis, Chrysomphalus aonidum, Coccus hesperidum, Coccus pseudomagnoliarum, Dialeurodes citri, Diaphorina citri, Diaprepes abbreviates, Egira (Xylomyges) curialis, Empoasca* sp such as *Empoasca fabae, Empoasca devastans, Eotetranychus sexmaculatus, Eotetranychus yumensis, Eriophyes sheldoni, Eutetranychus banksi, Forficula auricularia, Frankliniella* spp, *Heliothrips haemorrhoidalis, Homalodisca vitripennis, Icerya purchase, Lepidosaphes beckii, Lepidosaphes gloveri, Leptoglossus zonatus, Marmara gulosa, Melanoplus devastator, Microcentrum retinerve, Naupactus (Asynonychus) godmani, Oedaleonotus enigma, Orgyia vetusta, Ostrinia nubilalis, Panonychus* sp such as *Panonychus citri, Papilio zelicaon, Parabemisia myricae, Parlatoria pergandii, Phyllocnistis citrella, Phyllocoptruta oleivora, Pinnaspisas pidistrae, Planococcus citri, Platynota stultana, Polyphagotarsonemus latus, Pseudococcus* spp, *Pyroderces rileyi, Saissetia neglecta, Saissetia oleae, Scirtothrips* sp, *Scudderia furcate, Siphoninus phillyreae, Spodoptera exigua, Tetranychus* sp such as *Tetranychus kanzawai, Tetranychus urticae, Toxoptera aurantii, Trichoplusia ni, Unaspis citri*, COL: Elateridae, *Amrasca biguttula biguttula, Acizzia solanicola, Agriotes* sp such as *Agriotes lineatus, Agriotes obscurus, Amphimallon solstitialis, Amrasca devastans, Aulacorthum circumflexum, Aulacorthum solani, Autographa californica, Bactericera* sp such as *Bactericera nigricornis, Bactericera cockerelli, Bemisia argentifolii, Circulifer tennelus, Diabrotica speciosa, Epitrix* spp., *Heliothis zea, Henosepilachna vigintioctomaculata, Heterodera* spp., *Holotrichia oblita, Leptinotarsa* sp such as *Leptinotarsa decemlineata, Limonius* sp such as *Limonius canus, Limonius californicus, Ctenicera pruinina, Liriomyza* spp, *Macrosiphum* sp such as *Macrosiphum euphorbiae, Macrosteles fascifrons, Meloidogyne hapla, Meloidogyne chitwoodi, M. incognita, Monomorium pharaonic, Myzus ascalonicus, Myzus ornatus, Pemphigus* sp., *Peridroma saucia, Phthorimaea* spp, *Phthorimaea operculella, Pratylenchus penetrans, P. neglectus, Paratrichodorus* sp., *Pseudoplusia includens, Rhopalosiphoninus latysiphon, Rhopalosiphum rufiabdominalis, Russelliana solanicola Tuthill, Smynthurodes betae, Spodoptera eridania, Spodoptera frugiperda, Spodoptera litura, Ceratitis capitata.*

Preferred pests are *Abacarus sacchari, Acigona steniellus, Aleurolobus barodensis, Cavelerius excavatus, Ceratovacuna lanigera, Chilo* sp such as *Chilo auricillus, Chilo infescatellus, Chilo saccharifagus indicus, Chilo terrenellus, Chilo tumidicostaks, Conoderus* sp, *Coptotermes heimi, Diaprepes abbreviatus, Eldana saccharin, Emmalocera depresella, Fulmekiola serrata, Haplothrips* sp, *Hoplolaimus indicus, Leptodictya tabida, Mahanarva* sp such as *Mahanarva fimbriolata, Melanaphis sacchari, Melanaspis glomerata, Melanaspis glomerate, Melanotus communis, Meloidogyne javanica, Metamasius hemipterous, Migdolus* sp such as *Migdolus fryanus, Miscrotermes obesi, Myasmia trapezalis, Odontotermes* sp such as *Odontotermes assmuthi, O wallonensis, O. obesus, Oligonychus stickneyl, Schizotetranychus* sp, *Perkinsiella saccharicida, Perkinsiella vastatrix, P. vitiensis, Pipersia sacchari, Polyocha depressella, Pratylenchus* spp, *Pyrilla purpusilla, Rhabdoscelus obscurus, Rotylenchulus reniformis, Saccharosydne saccharivora, Schistocerca americana, Scirpophaga*

*excerptalis, Sesamia grisescens, Sipha flava, Sphenophorus* sp such as *Sphenophorus levis, Tomarus subtropicus, Trinervitermes bifomis, Tryporyza nivella, Agrotis ipsilon, Athalia rosae, Autographia californica, Brevicoryne brassicae, Ceutorhynchus* sp such as *Ceutorhynchus assimilis, Ceutorhynchus napi, Ceutorhynchus obstrictus, Ceutorhynchus pallidactylus, Ceutorhynchus picitarsis, Ceutorhynchus quadridens, Contarinia nasturtii, Dasineura brassicae, Delia brassicae, Dicestra trifoli, Entomoscelis americana, Lygus* spp., *Mamestra* sp such as *Mamestra configurata, Meligethes* sp such as *Meligethes aeneus, Meligethes vindescens, Phyllotreta* spp, *Phyllotreta cruciferae, Phyllotreta memorum, Phyllotreta undulata, Phyllotreta diademata Phyllotreta striolata, Phytomyza rufipes, Piens sp., Plutella xylostella, Psylliodes* sp such as *Psylliodes chrysocephala, Psylliodes punctulata, Vanessa cardui, Aleurothrbos floccosus, Amorbia cuneana, Anacamptodes fragilaria, Aonidiella aurantii, Aonidiella citrina, Aphis* sp such as *Aphis fabae, Aphis frangulae, Aphis nasturtii, Aphis gossypii, Aphis spiraecola, Archips argyrospllam, Argyrotaenia (=citrana) franciscana, Brevipalpus* sp such as *Brevipalpus lewisi, Caliothrips fasciatus, Cantareus asperses, Ceroplastes floridensis, Chrysomphalus aonidum, Coccus hesperidum, Coccus pseudomagnoliarum, Dialeurodes citri, Diaphorina citri, Diaprepes abbreviates, Egira (Xylomyges) curialis, Empoasca* sp such as *Empoasca fabae, Empoasca devastans, Eotetranychus sexmaculatus, Eotetranychus yumensis, Eriophyes sheldoni, Eutetranychus banksi, Forficula auricularia, Frankliniella* spp, *Heliothrips haemorrhoidalis, Homalodisca vitripennis, Icerya purchase, Lepidosaphes beckii, Lepidosaphes gloveri, Leptoglossus zonatus, Marmara gulosa, Melanoplus devastator, Microcentrum retinerve, Naupactus (Asynonychus) godmani, Oedaleonotus enigma, Orgyia vetusta, Ostrinia nubilalis, Panonychus* sp such as *Panonychus citri, Papilio zelicaon, Parabemisia myricae, Parlatoria pergandii, Phyllocnistis citrella, Phyllocoptruta oleivora, Pinnaspisas pidistrae, Planococcus citri, Platynota stultana, Polyphagotarsonemus latus, Pyroderces rileyi, Saissetia neglecta, Saissetia oleae, Scirtothrips* sp, *Scudderia furcate, Siphoninus phillyreae, Spodoptera exigua, Tetranychus* sp such as *Tetranychus kanzawai, Tetranychus urticae, Toxoptera aurantii, Trichoplusia ni, Unaspis citri,* COL: Elateridae, *Amrasca biguttula biguttula, Acizzia solanicola, Agriotes* sp such as *Agriotes lineatus, Agriotes obscurus, Amphimallon solstitialis, Amrasca devastans, Aulacorthum circumflexum, Aulacorthum solani, Autographa californica, Bactericera* sp such as *Bactericera nigricornis, Bactericera cockerelli, Bemisia argentifolii, Circulifer tennelus, Diabrotica speciosa, Epitrix* spp., *Heliothis zea, Henosepilachna vigintioctomaculata, Heterodera* spp., *Holotrichia oblita, Leptinotarsa* sp such as *Leptinotarsa decemlineata, Limonius* sp such as *Limonius canus, Limonius californicus, Ctenicera pruinina, Liriomyza* spp, *Macrosiphum* sp such as *Macrosiphum euphorbiae, Melodogyne hapla, Meloidogyne chitwoodi, M. incognita, Monomorium pharaonic, Myzus ascalonicus, Myzus ornatus, Pemphigus* sp., *Peridroma saucia, Phthorimaea* spp, *Phthorimaea operculella, Pratylenchus penetrans, P. neglectus, Paratrichodorus* sp., *Pseudoplusia includens, Rhopalosiphoninus latysiphon, Russelliana solanicola* Tuthill, *Smynthurodes betae, Spodoptera eridania, Spodoptera litura,* and *Ceratitis capitata.*

In more preferred embodiment of the invention, the invertebrate pests are selected from *Odontotermes* sp, *Chilo* sp, *Diatraea* sp, *Sphenophorus* sp, *Migdolus* sp, *Mahanarva* sp, *Phyllotreta* sp, *Psylliodes* sp, *Meligethes* sp, *Ceutorhynchus* sp and *Mamestra* sp., *Diaphorina citri, Tetranychus* sp, *Panonychus* sp, *Brevipalpus* sp, *Phyllocnistis citrella, Aonidiella aurantii, Phyllocoptruta oleivora* and *Ceratitis capitata, Leptinotarsa* sp, *Limonius* sp, *Agriotes* sp, *Empoasca* sp, psyllids, *Bactericera* sp, *Myzus* sp, *Macrosiphum* sp, *Aphis* sp, and *Phthorimaea* sp.

Also in more preferred embodiment of the invention, the invertebrate pests are selected from *Odontotermes* sp, *Chilo* sp *Diatraea* sp, *Sphenophorus* sp, *Migdolus* sp, *Mahanarva* sp, *Phyllotreta* sp, *Psylliodes* sp, *Meligethes* sp, *Ceutorhynchus* sp and *Mamestra* sp., *Diaphorina citri, Tetranychus* sp, *Panonychus* sp, *Brevipalpus* sp, *Phyllocnistis citrella, Aonidiella aurantii, Phyllocoptruta oleivora* and *Ceratitis capitata, Leptinotarsa* sp, *Limonius* sp, *Agriotes* sp, *Empoasca* sp, psyllids, *Bactericera* sp, *Myzus* sp, *Aphis* sp, and *Phthorimaea* sp.

In a preferred embodiment, the pests are selected from *Mahanarva fimbriolata, Meligethes aeneus, Phyllotreta striolata, Diaphorina citri,* and *Leptinotarsa decemlineata;*

In one preferred embodiment of the invention, the plant is of sugarcane and the invertebrate pests are selected from *Abacarus sacchari, Acigona steniellus, Aleurolobus barodensis, Cavelerius excavatus, Ceratovacuna lanigera, Chilo auricillus, Chilo infescatellus, Chilo partellus, Chilo saccharifagus indicus, Chilo terrenellus, Chilo tumidicostaks, Conoderus* sp, *Coptotermes heimi, Diaprepes abbreviatus, Diatraea saccharalis, Elasmopalpus lignosellus, Eldana saccharin, Emmalocera depresella, Fulmekiola serrata, Haplothrips* sp, *Hoplolaimus indicus, Leptodictya tabida, Mahanarva fimbriolata, Melanaphis sacchari, Melanaspis glomerata, Melanaspis glomerate, Melanotus communis, Meloidogyne javanica, Metamasius hemipterous, Migdolus fryanus, Miscrotermes obesi, Myasmia trapezalis, Odontotermes assmuthi, O wallonensis, O. obesus, Oligonychus stickneyl, Schizotetranychus* sp, *Perkinsiella saccharicida, Perkinsiella vastatrix, P. vitiensis, Pipersia sacchari, Polyocha depressella, Pratylenchus* spp, *Pyrilla purpusilla, Rhabdoscelus obscurus, Rotylenchulus reniformis, Saccharosydne saccharivora, Schistocerca americana, Scirpophaga excerptalis, Sesamia grisescens, Sesamia inferens, Sipha flava, Sphenophorus levis, Tomarus subtropicus, Trinervitermes bifomis,* and *Tryporyza nivella;* preferably the pest is *Mahanarva fimbriolata;*

In another preferred embodiment of the invention, the plant is of sugarcane and the invertebrate pests are selected from *Abacarus sacchari, Acigona steniellus, Aleurolobus barodensis, Cavelerius excavatus, Ceratovacuna lanigera, Chilo auricillus, Chilo infescatellus, Chilo saccharifagus indicus, Chilo terrenellus, Chilo tumidicostalis, Conoderus* sp, *Coptotermes heimi, Diaprepes abbreviatus, Eldana saccharina, Emmalocera depresella, Fulmekiola serrata, Haplothrips* sp, *Hoplolaimus indicus, Leptodictya tabida, Mahanarva fimbriolata, Melanaphis sacchari, Melanaspis glomerata, Melanaspis glomerate, Melanotus communis, Meloidogyne javanica, Metamasius hemipterous, Migdolus fryanus, Miscrotermes obesi, Myasmia trapezalis, Odontotermes assmuthi, O wallonensis, O. obesus, Oligonychus stickneyl, Schizotetranychus* sp, *Perkinsiella saccharicida, Perkinsiella vastatrix, P. vitiensis, Pipersia sacchan, Polyocha depressella, Pratylenchus* spp, *Pyrilla purpusilla, Rhabdoscelus obscurus, Rotylenchulus reniformis, Saccharosydne saccharivora, Schistocerca americana, Scirpophaga excerptalis, Sesamia grisescens, Sipha flava, Sphenophorus levis, Tomarus subtropicus, Trinervitermes bifomis,* and *Tryporyza nivella;* preferably the pest is *Mahanarva fimbriolata;*

In more preferred embodiment of the invention, the plant is of sugarcane and the invertebrate pests are selected from

*Odontotermes* sp, *Chilo* sp, *Diatraea* sp, *Sphenophorus* sp, *Migdolus* sp and *Mahanarva* sp.; more preferably the pest is *Mahanarva fimbriolata*;

In another preferred embodiment of the invention, the plant is of rapeseed and the invertebrate pests are selected from *Agrotis ipsilon*, *Athalia rosae*, *Autographia californica*, *Brevicoryne brassicae*, *Ceutorhynchus assimilis*, *Ceutorhynchus napi*, *Ceutorhynchus obstrictus*, *Ceutorhynchus pallidactylus*, *Ceutorhynchus picitarsis*, *Ceutorhynchus quadridens*, *Contarinia nasturtii*, *Dasineura brassicae*, *Delia brassicae*, *Dicestra trifoli*, *Entomoscelis americana*, *Lygus* spp., *Mamestra configurata*, *Meligethes aeneus*, *Meligethes viridescens*, *Phyllotreta cruciferae*, *Phyllotreta memorum*, *Phyllotreta undulata*, *Phyllotreta diademata*, *Phyllotreta* spp, *Phyllotreta striolata*, *Phytomyza rufipes*, *Piens* sp., *Plutella xylostella*, *Psylliodes chrysocephala*, *Psylliodes punctulata*, and *Vanessa cardui*; preferably the pest is *Meligethes aeneus* or *Phyllotreta striolata*;

In more preferred embodiment of the invention, the plant is of rapeseed and the invertebrate pests are selected from *Phyllotreta* sp, *Psylliodes* sp, *Meligethes* sp, *Ceutorhynchus* sp and *Mamestra* sp.; more preferably the pest is *Meligethes aeneus* or *Phyllotreta striolata*;

In another preferred embodiment of the invention, the plant is of *Citrus* and the invertebrate pests are selected from *Aleurothrixus floccosus*, *Amorbia cuneana*, *Anacamptodes fragilaria*, *Aonidiella aurantii*, *Aonidiella citrina*, *Aphis gossypii*, *Aphis spiraecola*, *Archips argyrospilam*, *Argyrotaenia* (=*citrana*) *franciscana*, *Brevipalpus lewisi*, *Ceratitis capitata*, *Caliothrips fasciatus*, *Cantareus asperses*, *Ceroplastes floridensis*, *Chrysomphalus aonidum*, *Coccus hesperidum*, *Coccus pseudomagnoliarum*, *Dialeurodes citri*, *Diaphorina citri*, *Diaprepes abbreviates*, *Egira* (*Xylomyges*) *curialis*, *Empoasca fabae*, *Eotetranychus sexmaculatus*, *Eotetranychus yumensis*, *Eriophyes sheldoni*, *Eutetranychus banksi*, *Forficula auricularia*, *Frankliniella* spp, *Heliothrips haemorrhoidalis*, *Homalodisca vitripennis*, *Icerya purchase*, *Lepidosaphes beckii*, *Lepidosaphes gloveri*, *Leptoglossus zonatus*, *Marmara gulosa*, *Melanoplus devastator*, *Microcentrum retinerve*, *Naupactus* (*Asynonychus*) *godmani*, *Oedaleonotus enigma*, *Orgyia vetusta*, *Ostrinia nubilalis*, *Panonychus citri*, *Papilio zelicaon*, *Parabemisia myricae*, *Parlatoria pergandii*, *Phyllocnistis citrella*, *Phyllocoptruta oleivora*, *Pinnaspisas pidistrae*, *Planococcus citri*, *Platynota stultana*, *Polyphagotarsonemus latus*, *Pseudococcus* spp, *Pyroderces rileyi*, *Saissetia neglecta*, *Saissetia oleae*, *Scirtothrips* sp, *Scudderia furcate*, *Siphoninus phillyreae*, *Spodoptera exigua*, *Tetranychus kanzawai*, *Tetranychus urticae*, *Tetranychus urticae*, *Toxoptera aurantii*, *Trichoplusia ni*, and *Unaspis citri*; preferably the pest is *Diaphorina citri*;

In another preferred embodiment of the invention, the plant is of *Citrus* and the invertebrate pests are selected from *Aleurothrixus floccosus*, *Amorbia cuneana*, *Anacamptodes fragilaria*, *Aonidiella aurantii*, *Aonidiella citrina*, *Aphis gossypii*, *Aphis spiraecola*, *Archips argyrospilam*, *Argyrotaenia* (=*citrana*) *franciscana*, *Brevipalpus lewisi*, *Ceratitis capitata*, *Caliothrips fasciatus*, *Cantareus asperses*, *Ceroplastes floridensis*, *Chrysomphalus aonidum*, *Coccus hesperidum*, *Coccus pseudomagnoliarum*, *Dialeurodes citri*, *Diaphorina citri*, *Diaprepes abbreviates*, *Egira* (*Xylomyges*) *curialis*, *Empoasca fabae*, *Eotetranychus sexmaculatus*, *Eotetranychus yumensis*, *Eriophyes sheldoni*, *Eutetranychus banksi*, *Forficula auricularia*, *Frankliniella* spp, *Heliothrips haemorrhoidalis*, *Homalodisca vitripennis*, *Lcerya purchase*, *Lepidosaphes beckii*, *Lepidosaphes gloveri*, *Leptoglossus zonatus*, *Marmara gulosa*, *Melanoplus devastator*, *Microcentrum retinerve*, *Naupactus* (*Asynonychus*) *godmani*, *Oedaleonotus enigma*, *Orgyia vetusta*, *Ostrinia nubilalis*, *Panonychus citri*, *Papilio zelicaon*, *Parabemisia myricae*, *Parlatoria pergandii*, *Phyllocnistis citrella*, *Phyllocoptruta oleivora*, *Pinnaspisas pidistrae*, *Planococcus citri*, *Platynota stultana*, *Polyphagotarsonemus latus*, *Pyroderces rileyi*, *Saissetia neglecta*, *Saissetia oleae*, *Scirtothrips* sp, *Scudderia furcate*, *Siphoninus phillyreae*, *Spodoptera exigua*, *Tetranychus kanzawai*, *Tetranychus urticae*, *Tetranychus urticae*, *Toxoptera aurantii*, *Trichoplusia ni*; and *Unaspis citri*; preferably the pest is *Diaphorina citri*;

In more preferred embodiment of the invention, the plant is of *Citrus* and the invertebrate pests are selected from *Diaphorina citri*, *Tetranychus* sp, *Panonychus* sp, *Brevipalpus* sp, *Phyllocnistis citrella*, *Aonidiella aurantii*, *Phyllocoptruta oleivora*, and *Ceratitis capitata*; more preferably the pest is *Diaphorina citri*;

In one embodiment of the invention, the plant or seed is of potato and the pests are selected from COL: Elateridae, *Amrasca biguttula biguttula*, *Acizzia solanicola*, *Agriotes lineatus*, *Agriotes obscurus*, *Agrotis ipsilon*, *Amphimallon solstitialis*, *Amrasca devastans*, *Aphis fabae*, *Aphis frangulae*, *Aphis gossypii*, *Aphis nasturtii*, *Aphis spiraecola*, *Aulacorthum circumflexum*, *Aulacorthum solani*, *Autographa californica*, *Bactericera nigricornis*, *Bactericera cockerelli*, *Bemisia argentifolii*, *Circulifer tennelus*, *Diabrotica speciosa*, *Empoasca devastans*, *Empoasca fabae*, *Epitrix* spp., *Heliothis zea*, *Henosepilachna vigintioctomaculata*, *Heterodera* spp., *Holotrichia oblita*, *Leptinotarsa decemlineata*, *Limonius canus*, *Limonius californicus*, *Ctenicera pruinina*, *Liriomyza* spp, *Macrosiphum euphorbiae*, *Macrosteles fascifrons*, *Meloidogyne hapla*, *Meloidogyne chitwoodi*, *M. incognita*, *Monomorium pharaonic*, *Myzus ascalonicus*, *Myzus ornatus*, *Pemphigus* sp., *Peridroma saucia*, *Phthorimaea operculella*, *Phthorimaea* spp, *Pratylenchus penetrans*, *P. neglectus*, *Paratrichodorus* sp., *Pseudoplusia includens*, *Rhopalosiphoninus latysiphon*, *Rhopalosiphum rufiabdominalis*, *Russelliana solanicola Tuthill*, *Smynthurodes betae*, *Spodoptera eridania*, *Spodoptera frugiperda*, and *Spodoptera litura*; preferably the pest is *Leptinotarsa decemlineata*;

In another embodiment of the invention, the plant or seed is of potato and the pests are selected from COL: Elateridae, *Amrasca biguttula biguttula*, *Acizzia solanicola*, *Agriotes lineatus*, *Agriotes obscurus*, *Agrotis ipsilon*, *Amphimallon solstitialis*, *Amrasca devastans*, *Aphis fabae*, *Aphis frangulae*, *Aphis gossypii*, *Aphis nasturtii*, *Aphis spiraecola*, *Aulacorthum circumflexum*, *Aulacorthum solani*, *Autographa californica*, *Bactericera nigricornis*, *Bactericera cockerelli*, *Bemisia argentifolii*, *Circulifer tennelus*, *Diabrotica speciosa*, *Empoasca devastans*, *Empoasca fabae*, *Epitrix* spp., *Heliothis zea*, *Henosepilachna vigintioctomaculata*, *Heterodera* spp., *Holotrichia oblita*, *Leptinotarsa decemlineata*, *Limonius canus*, *Limonius californicus*, *Ctenicera pruinina*, *Liriomyza* spp, *Macrosiphum euphorbiae*, *Meloidogyne hapla*, *Meloidogyne chitwoodi*, *M. incognita*, *Monomorium pharaonic*, *Myzus ascalonicus*, *Myzus ornatus*, *Pemphigus* sp., *Peridroma saucia*, *Phthorimaea operculella*, *Phthorimaea* spp, *Pratylenchus penetrans*, *P. neglectus*, *Paratrichodorus* sp., *Pseudoplusia includens*, *Rhopalosiphoninus latysiphon*, *Russelliana solanicola Tuthill*, *Smynthurodes betae*, *Spodoptera eridania*, and *Spodoptera litura*; preferably the pest is *Leptinotarsa decemlineata*;

In more preferred embodiment of the invention, the plant is of potato and the invertebrate pests are selected from *Leptinotarsa* sp, *Limonius* sp, *Agriotes* sp, *Empoasca* sp, psyllids, *Bactericera* sp, *Myzus* sp, *Macrosiphum* sp, *Aphis* sp, and *Phthorimaea* sp; more preferably the pest is *Leptinotarsa decemlineata*;

Also in more preferred embodiment of the invention, the plant is of potato and the invertebrate pests are selected from *Leptinotarsa* sp, *Limonius* sp, *Agriotes* sp, *Empoasca* sp, psyllids, *Bactericera* sp, *Myzus* sp, *Aphis* sp, and *Phthorimaea* sp; more preferably the pest is *Leptinotarsa decemlineata*;

Also in more preferred embodiment of the invention, the plant is of potato, rapeseed, sugarcane, or *Citrus* and the invertebrate pests are selected from *Phyllotreta striolata*, *Leptinotarsa decimlineata*, *Mahanarva* sp., *Diaphorina* sp., *Meligethes aeneus*, and *Leptinotarsa decemlineata*;

The methods and uses of the invention are for controlling and/or preventing infestation of sugarcane, *Citrus*, rapeseed, and potato plants, sugarcane, *Citrus*, rapeseed, and potato crops and sugarcane, *Citrus*, rapeseed, and potato plant propagation material, by pests.

In general, the pests are as listed above. Preferably the methods and uses of the present invention are applied against pests that are resistant to other insecticides, e.g. pyrethroid insecticides. The expected sensitivity can be measured using e.g. a strain that has not previously been exposed to the insecticide.

In an embodiment of the invention, the method comprises applying to sugarcane, *Citrus*, rapeseed, and potato plants, crops and/or propagation material, a compound of the invention, wherein the method is for controlling and/or preventing infestation by pests.

In another embodiment of the invention, the method comprises applying to sugarcane, *Citrus*, rapeseed, and potato plants, crops and/or propagation material, in particular sugarcane plants, sugarcane crops and/or propagation material of sugarcane plants, a compound of the formula I, wherein the method is for controlling and/or preventing infestation by pests.

In another embodiment of the invention, the method comprises applying to sugarcane, *Citrus*, rapeseed, and potato plants, crops and/or propagation material, in particular *Citrus* plants, *Citrus* crops and/or propagation material of *Citrus* plants, a compound of the formula I, wherein the method is for controlling and/or preventing infestation by pests.

In another embodiment of the invention, the method comprises applying to sugarcane, *Citrus*, rapeseed, and potato plants, crops and/or propagation material, in particular rapeseed plants, rapeseed crops and/or propagation material of rapeseed plants, a compound of the formula I, wherein the method is for controlling and/or preventing infestation by pests.

In another embodiment of the invention, the method comprises applying to sugarcane, *Citrus*, rapeseed, and potato plants, crops and/or propagation material, in particular potato plants, potato crops and/or propagation material of potato plants, a compound of the formula I, wherein the method is for controlling and/or preventing infestation by pests.

In another embodiment, the invention provides the use of the compounds of the invention for controlling pests that are resistant to one or more other insecticides, preferably pyrethroids, neonicotinoids and organophosphates, and more preferably pyrethroid insecticides.

The compounds applied in the methods of the invention may be used on sugarcane, *Citrus*, rapeseed, and potato plants, including genetically modified plants.

The compounds of the invention applied in the methods of the invention are used on sugarcane, *Citrus*, rapeseed, and potato plants, to control, any of: *Odontotermes* sp, *Chilo* sp *Diatraea* sp, *Sphenophorus* sp, *Migdolus* sp, *Mahanarva* sp, *Phyllotreta* sp, *Psylliodes* sp, *Meligethes* sp, *Ceutorhynchus* sp and *Mamestra* sp., *Diaphorina citri*, *Tetranychus* sp, *Panonychus* sp, *Brevipalpus* sp, *Phyllocnistis citrella*, *Aonidiella aurantii*, *Phyllocoptruta oleivora* and *Ceratitis capitata*, *Leptinotarsa* sp, *Limonius* sp, *Agriotes* sp, *Empoasca* sp, psyllids, *Bactericera* sp, *Myzus* sp, *Macrosiphum* sp, *Aphis* sp, and *Phthorimaea* sp.

Also the compounds of the invention applied in the methods of the invention are used on sugarcane, *Citrus*, rapeseed, and potato plants, to control, any of: *Odontotermes* sp, *Chilo* sp *Diatraea* sp, *Sphenophorus* sp, *Migdolus* sp, *Mahanarva* sp, *Phyllotreta* sp, *Psylliodes* sp, *Meligethes* sp, *Ceutorhynchus* sp and *Mamestra* sp., *Diaphorina citri*, *Tetranychus* sp, *Panonychus* sp, *Brevipalpus* sp, *Phyllocnistis citrella*, *Aonidiella aurantii*, *Phyllocoptruta oleivora* and *Ceratitis capitata*, *Leptinotarsa* sp, *Limonius* sp, *Agriotes* sp, *Empoasca* sp, psyllids, *Bactericera* sp, *Myzus* sp, *Aphis* sp, and *Phthorimaea* sp.

The compounds of the invention are preferably used on sugarcane, to control, any of: *Odontotermes* sp, *Chilo* sp, *Diatraea* sp, *Sphenophorus* sp, *Migdolus* sp and *Mahanarva* sp.; more preferably the pest is *Mahanarva fimbriolata*; and in particular *Mahanarva* sp are the preferred targets.

The compounds of the invention are preferably used on rapeseed, preferably canola, to control, any of: *Phyllotreta* sp, *Psylliodes* sp, *Meligethes* sp, *Ceutorhynchus* sp and *Mamestra* sp.; and in particular *Phyllotreta* sp and *Meligethes* sp are the preferred targets.

The compounds of the invention are preferably used on *Citrus*, preferably oranges, mandarins, lemons, grapefruit, pomelo and limes, to control, any of: *Diaphorina citri*, *Tetranychus* sp, *Panonychus* sp, *Brevipalpus* sp, *Phyllocnistis citrella*, *Aonidiella aurantii*, *Phyllocoptruta oleivora* and *Ceratitis capitata*; more preferably the pest is *Mahanarva fimbriolata*; and in particular *Diaphorina citri* are the preferred targets.

The compounds of the invention are preferably used on potato, to control, any of: *Leptinotarsa* sp, *Limonius* sp, *Agriotes* sp, *Empoasca* sp, psyllids, *Bactericera* sp, *Myzus* sp, *Macrosiphum* sp, *Aphis* sp, *Phthorimaea* sp; and in particular *Leptinotarsa* sp are the preferred targets.

Also the compounds of the invention are preferably used on potato, to control, any of: *Leptinotarsa* sp, *Limonius* sp, *Agriotes* sp, *Empoasca* sp, psyllids, *Bactericera* sp, *Myzus* sp, *Aphis* sp, *Phthorimaea* sp; and in particular *Leptinotarsa* sp are the preferred targets.

In some embodiments, the invention relates to methods and uses, wherein the compound of the formula (I) is applied in an application type which corresponds in each case to one row of Table Z.

TABLE Z

| Sr No | plant | pest |
|---|---|---|
| 1. | sugarcane | *Odontotermes* sp |
| 2. | sugarcane | *Chilo* sp |
| 3. | sugarcane | *Diatraea* sp |
| 4. | sugarcane | *Sphenophorus* sp, |
| 5. | sugarcane | *Migdolus* sp |
| 6. | sugarcane | *Mahanarva* sp |
| 7. | rapeseed | *Phyllotreta* sp |
| 8. | rapeseed | *Psylliodes* sp |

TABLE Z-continued

| Sr No | plant | pest |
|---|---|---|
| 9. | rapeseed | *Meligethes* sp |
| 10. | rapeseed | *Ceutorhynchus* sp |
| 11. | rapeseed | *Mamestra* sp |
| 12. | citrus | *Diaphorina citri* |
| 13. | citrus | *Tetranychus* sp |
| 14. | citrus | *Panonychus* sp |
| 15. | citrus | *Brevipalpus* sp |
| 16. | citrus | *Phyllocnistis citrella* |
| 17. | citrus | *Aonidiella aurantii* |
| 18. | citrus | *Phyllocoptruta oleivora* |
| 19. | citrus | *Ceratitis capitata* |

In some embodiments, the invention relates to methods and uses, wherein the compound of the formula (I) as component I and at least one mixing partner as defined below, are applied in an application type which corresponds in each case to one row of Table Z.

The present invention also relates to a mixture of at least one compound of the present invention with at least one mixing partner as defined herein after. Preferred are binary mixtures of one compound of the present invention as component I with one mixing partner as defined herein after as component II. Preferred weight ratios for such binary mixtures are from 5000:1 to 1:5000, preferably from 1000:1 to 1:1000, more preferably from 100:1 to 1:100, particularly preferably from 10:1 to 1:10. In such binary mixtures, components I and II may be used in equal amounts, or an excess of component I, or an excess of component II may be used.

Mixing partners can be selected from pesticides, in particular insecticides, nematicides, and acaricides, fungicides, herbicides, plant growth regulators, fertilizers, and the like. Preferred mixing partners are insecticides, nematicides and fungicides.

As mentioned further above, in one embodiment of the invention, the pesticidal compound of formula (I) can be combined and used in mixture (composition) with at least another active compound II ap-plied in agriculture, such as another insecticidal active or a fungicidal active. In another embodiment of the invention, the pesticidal compound of formula (I) can be combined and used in mixture with more than one other active compound applied in agriculture. Thus the pesticidal compound of formula (I) can be combined and used in mixture with more than one other insecticide and/or with more than one fungicide.

For example the pesticidal compound of formula (I) can be combined and used in mixture with one, two, three or four other agriculturally active compounds/mixing partners selected from pesticides, in particular insecticides, nematicides, and acaricides, fungicides, herbicides, plant growth regulators, fertilizers. Preferred mixing partners are insecticides, nematicides and fungicides.

The of pesticides/pesticidally active compounds, together with which the mixtures of the invention can be used and with which potential synergistic effects might be produced, such pesticides for example are described in WO2014/167084.

A skilled person is familiar with such compounds and knows which com-pounds are active against a specific target organism.

In a further embodiment, the invention relates to mixtures comprising a compound of formula (I) as described above, in particular the compound I-R-1, and at least one compound II which is metaaldehyde, in particular granular metaaldehyde.

The present invention relates to a mixture of at least one compound I or non-racemic compound of formula (I) or compound of formula (I) with enantiomeric excess of compound of formula I-R-1 or the compound I-R-1, of the present invention as component I with at least one mixing partner II as defined above. In one embodiment, the invention relates to binary mixtures of one components I with one mixing partner II as defined above as component II.

Preferred weight ratios for such binary mixtures are from 10000:1 to 1:10000, preferably from 7000:1 to 1:7000, also preferably from 5000:1 to 1:5000, also preferably from 1000:1 to 1:1000, more preferably from 100:1 to 1:100, also more preferably from 70:1 to 1:70, particularly preferably from 25:1 to 1:25, also particularly preferably from 10:1 to 1:10. In such binary mixtures, components I and II may be used in equal amounts, or an excess of component I, or an excess of component II may be used.

In the mixtures of the present invention, the ingredients may be used sequentially or in combination with each other, if appropriate also added only immediately prior to use (tank mix). For example, the plant(s) may be sprayed with compound II either before or after being treated with component I.

Insecticidal compositions for use typically contain from 0.001 to 95 weight %, preferably from 0.1 to 45 weight %, and more preferably from 1 to 25 weight % of at least one repellent and/or insecticide.

Ready-to-use preparations contain the compounds acting against parasites, preferably ectoparasites, in concentrations of 10 ppm to 80 percent by weight, preferably from 0.1 to 65 percent by weight, more preferably from 1 to 50 percent by weight, most preferably from 5 to 40 percent by weight.

Preparations which are diluted before use contain the compounds acting against ectoparasites in concentrations of 0.5 to 90 percent by weight, preferably of 1 to 50 percent by weight.

The compounds of the invention may be applied in the methods of the present invention in mixtures with fertilizers (for example nitrogen-, potassium- or phosphorus-containing fertilizers). Suitable formulation types include granules of fertilizer. The mixtures preferably contain up to 25% by weight of the compound of the invention.

An additional mixing partner may provide a composition having a broader spectrum of activity or increased persistence at a locus; synergize the activity or complement the activity (for example by increasing the speed of effect or overcoming repellency) of the compound of the invention; or help to overcome or prevent the development of resistance to individual components. The particular additional active ingredient will depend upon the intended utility of the composition.

The compounds of the invention may be mixed with soil, peat or other rooting media for the protection of plants against seed-borne, soil-borne or foliar fungal diseases.

Examples of suitable synergists for use in the compositions include piperonyl butoxide, sesamex, safroxan, and dodecyl imidazole.

The invention also relates to agrochemical compositions comprising an auxiliary and at least one compound of the present invention or a mixture thereof.

An agrochemical composition comprises a pesticidally effective amount of a compound of the present invention or a mixture thereof. The term "pesticidally effective amount" is defined below.

The compounds of the present invention or the mixtures thereof can be converted into customary types of agrochemical compositions, e. g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further compositions types are defined in the "Catalogue of pesticide formulation types and international coding system", Technical Mono-graph No. 2, 6th Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Examples for suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkyl naphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are homo- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the compounds of the present invention on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for composition types and their preparation are:
i) Water-Soluble Concentrates (SL, LS)
10-60 wt % of a compound I according to the invention and 5-15 wt % wetting agent (e.g. alcohol alkoxylates) are dissolved in water and/or in a water-soluble solvent (e.g. alcohols) up to 100 wt %. The active substance dissolves upon dilution with water.
ii) Dispersible Concentrates (DC)
5-25 wt % of a compound I according to the invention and 1-10 wt % dispersant (e. g. polyvinylpyrrolidone) are dissolved in up to 100 wt % organic solvent (e.g. cyclohexanone). Dilution with water gives a dispersion.

iii) Emulsifiable Concentrates (EC)

15-70 wt % of a compound I according to the invention and 5-10 wt % emulsifiers (e.g. calcium dodecylbenzenesulfonate and castor oil ethoxylate) are dissolved in up to 100 wt % water-insoluble organic solvent (e.g. aromatic hydrocarbon). Dilution with water gives an emulsion.

iv) Emulsions (EW, EO, ES)

5-40 wt % of a compound I according to the invention and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into up to 100 wt % water by means of an emulsifying machine and made into a homogeneous emulsion. Dilution with water gives an emulsion.

v) Suspensions (SC, OD, FS)

In an agitated ball mill, 20-60 wt % of a compound I according to the invention are comminuted with addition of 2-10 wt % dispersants and wetting agents (e.g. sodium lignosulfonate and alcohol ethoxylate), 0.1-2 wt % thickener (e.g. xanthan gum) and up to 100 wt % water to give a fine active substance suspension. Dilution with water gives a stable suspension of the active substance. For FS type composition up to 40 wt % binder (e.g. polyvinylalcohol) is added.

vi) Water-Dispersible Granules and Water-Soluble Granules (WG, SG)

50-80 wt % of a compound I according to the invention are ground finely with addition of up to 100 wt % dispersants and wetting agents (e.g. sodium lignosulfonate and alcohol ethoxylate) and prepared as water-dispersible or water-soluble granules by means of technical appliances (e. g. extrusion, spray tower, fluidized bed). Dilution with water gives a stable dispersion or solution of the active substance.

vii) Water-Dispersible Powders and Water-Soluble Powders (WP, SP, WS)

50-80 wt % of a compound I according to the invention are ground in a rotor-stator mill with addition of 1-5 wt % dispersants (e.g. sodium lignosulfonate), 1-3 wt % wetting agents (e.g. alcohol ethoxylate) and up to 100 wt % solid carrier, e.g. silica gel. Dilution with water gives a stable dispersion or solution of the active substance.

viii) Gel (GW, GF)

In an agitated ball mill, 5-25 wt % of a compound I according to the invention are comminuted with addition of 3-10 wt % dispersants (e.g. sodium lignosulfonate), 1-5 wt % thickener (e.g. carboxymethylcellulose) and up to 100 wt % water to give a fine suspension of the active substance. Dilution with water gives a stable suspension of the active substance.

ix) Microemulsion (ME)

5-20 wt % of a compound I according to the invention are added to 5-30 wt % organic solvent blend (e.g. fatty acid dimethylamide and cyclohexanone), 10-25 wt % surfactant blend (e.g. alcohol ethoxylate and arylphenol ethoxylate), and water up to 100%. This mixture is stirred for 1 h to produce spontaneously a thermodynamically stable microemulsion.

x) Microcapsules (CS)

An oil phase comprising 5-50 wt % of a compound I according to the invention, 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radi-cal initiator results in the formation of poly(meth)acrylate microcapsules. Alternatively, an oil phase comprising 5-50 wt % of a compound I according to the invention, 0-40 wt % water insolu-ble organic solvent (e.g. aromatic hydrocarbon), and an isocyanate monomer (e.g. diphenylme-thene-4,4'-diisocyanatae) are dispersed into an aqueous solution of a protective colloid (e.g. polyvinyl alcohol). The addition of a polyamine (e.g. hexamethylenediamine) results in the formation of a polyurea microcapsule. The monomers amount to 1-10 wt %. The wt % relate to the total CS composition.

xi) Dustable Powders (DP, DS)

1-10 wt % of a compound I according to the invention are ground finely and mixed intimately with up to 100 wt % solid carrier, e.g. finely divided kaolin.

xii) Granules (GR, FG)

0.5-30 wt % of a compound I according to the invention is ground finely and associated with up to 100 wt % solid carrier (e.g. silicate). Granulation is achieved by extrusion, spray-drying or the fluidized bed.

xiii) Ultra-Low Volume Liquids (UL)

1-50 wt % of a compound I according to the invention are dissolved in up to 100 wt % organic solvent, e.g. aromatic hydrocarbon.

The compositions types i) to xi) may optionally comprise further auxiliaries, such as 0.1-1 wt % bactericides, 5-15 wt % anti-freezing agents, 0.1-1 wt % anti-foaming agents, and 0.1-1 wt % colorants.

The agrochemical compositions generally comprise between 0.01 and 95%, preferably between 0.1 and 90%, and most preferably between 0.5 and 75%, by weight of active sub-stance. The active substances are employed in a purity of from 90% to 100%, preferably from 95% to 100% (according to NMR spectrum).

Various types of oils, wetters, adjuvants, fertilizer, or micronutrients, and other pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage de-vice, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

According to one embodiment, individual components of the composition according to the invention such as parts of a kit or parts of a binary or ternary mixture may be mixed by the user himself in a spray tank and further auxiliaries may be added, if appropriate.

In a further embodiment, either individual components of the composition according to the invention or partially premixed components, e. g. components comprising compounds of the present invention and/or mixing partners as defined above, may be mixed by the user in a spray tank and further auxiliaries and additives may be added, if appropriate.

In a further embodiment, either individual components of the composition according to the invention or partially premixed components, e. g. components comprising compounds of the present invention and/or mixing partners as defined above, can be applied jointly (e.g. after tank mix) or consecutively.

The compounds of the present invention are suitable for use in protecting crops, plants, plant propagation materials, such as seeds, or soil or water, in which the plants are growing, from attack or infestation by invertebrate pests. Therefore, the present invention also relates to a plant protection method, which comprises contacting crops, plants, plant propagation materials, such as seeds, or soil or water, in which the plants are growing, to be protected from attack or infestation by invertebrate pests pests, with a pesticidally effective amount of a compound of the present invention.

The compounds of the present invention are also suitable for use in combating or controlling invertebrate pests. Therefore, the present invention also relates to a method of combating or controlling invertebrate pests, which comprises contacting the invertebrate pests, their habitat, breeding ground, or food supply, or the crops, plants, plant propagation materials, such as seeds, or soil, or the area, material or environment in which the invertebrate pests are growing or may grow, with a pesticidally effective amount of a compound of the present invention.

The compounds of the present invention are effective through both contact and ingestion. Furthermore, the compounds of the present invention can be applied to any and all developmental stages, such as egg, larva, pupa, and adult.

The compounds of the present invention can be applied as such or in form of compositions comprising them as defined above. Furthermore, the compounds of the present invention can be applied together with a mixing partner as defined above or in form of compositions comprising said mixtures as defined above. The components of said mixture can be applied simultaneously, jointly or separately, or in succession, that is immediately one after another and thereby creating the mixture "in situ" on the desired location, e.g. the plant, the sequence, in the case of separate application, generally not having any effect on the result of the control measures.

The application can be carried out both before and after the infestation of the crops, plants, plant propagation materials, such as seeds, soil, or the area, material or environment by the pests.

Suitable application methods include inter alia soil treatment, seed treatment, in furrow application, and foliar application. Soil treatment methods include drenching the soil, drip irrigation (drip application onto the soil), dipping roots, tubers or bulbs, or soil injection. Seed treatment techniques include seed dressing, seed coating, seed dusting, seed soaking, and seed pelleting. In furrow applications typically include the steps of making a furrow in cultivated land, seeding the furrow with seeds, applying the pesticidally active compound to the furrow, and closing the furrow. Foliar application refers to the application of the pesticidally active compound to plant foliage, e.g. through spray equipment. For foliar applications, it can be advantageous to modify the behavior of the pests by use of pheromones in combination with the compounds of the present invention. Suitable pheromones for specific crops and pests are known to a skilled person and publicly available from databases of pheromones and semiochemicals, such as http://www.pherobase.com.

Application of the compounds of the invention is preferably to a crop of sugarcane, Citrus, rapeseed, or potato. Application may be before infestation or when the pest is present. Application of the compounds of the invention can be performed according to any of the usual methods of application, e.g. foliar, drench, soil, in furrow etc.

Control of pests can be achieved by foliar or drench application, which is a preferred mode of application according to the invention.

In another preferred embodiment of the invention, the application method is drench or foliar;

In another preferred embodiment of the invention, the application method is drench;

In another preferred embodiment of the invention, the application method is foliar;

In another preferred embodiment, the compounds of the invention are applied to sugarcane, Citrus, rapeseed, or potato crops by soil or drench application;

In another preferred embodiment of the invention, the plant is sugarcane, and the application method is drench;

In another preferred embodiment of the invention, the plant is rapeseed, and the application method is foliar;

In another preferred embodiment of the invention, the plant is Citrus, and the application method is drench or foliar;

In another preferred embodiment of the invention, the plant is Citrus, and the application method is drench;

In another preferred embodiment of the invention, the plant is Citrus, and the application method is foliar;

In another preferred embodiment of the invention, the plant is potato and the application method is foliar;

As used herein, the term "contacting" includes both direct contact (applying the compounds or compositions directly on the animal pest or plant—typically to the foliage, stem or roots of the plant) and indirect contact (applying the compounds/compositions to the locus, i.e. habitat, breeding ground, plant, seed, soil, area, material or environment in which a pest is growing or may grow, of the animal pest or plant).

The term "animal pest" includes arthropods, gastropods, and nematodes. Preferred animal pests according to the invention are arthropods, preferably insects and arachnids, in particular insects. Insects, which are of particular relevance for crops, are typically referred to as crop insect pests.

The compounds of the invention or the pesticidal compositions comprising them may be used to protect growing plants and crops from attack or infestation by animal pests, especially from sugarcane, Citrus, rapeseed, or potato pests, by contacting the plant/crop with a pesticidally effective amount of compounds of the invention. The term "crop" refers both to growing and harvested crops.

The compounds of the invention may be applied in combination with an attractant. An attractant is a chemical that causes the insect to migrate towards the location of application. For control of stinkbugs it can be advantageous to apply the compounds of the invention with an attractant, particularly when the application is foliar. Pests are often located near to the ground, and application of an attractant may encourage migration up the plant towards the active ingredient.

Suitable attractants include glucose, saccharose, salt, glutamate, citric acid, soybean oil, peanut oil and soybean milk. Glutamate and citric acid are of particular interest, with citric acid being preferred.

An attractant may be premixed with the compound of the invention prior to application, e.g. as a readymix or tankmix, or by simultaneous application or sequential application to the plant. Suitable rates of attractants are for example 0.02 kg/ha-3 kg/ha.

The compounds of the invention are preferably used for pest control on sugarcane, *Citrus*, rapeseed, or potato plants, at 1-500 g/ha, preferably 10-100 g/ha.

The term "crop" refers to both, growing and harvested crops.

The term "plant" includes cereals, e.g. durum and other wheat, rye, barley, triticale, oats, rice, or maize (fodder maize and sugar maize/sweet and field corn); beet, e.g. sugar beet or fodder beet; fruits, such as pomes, stone fruits or soft fruits, e.g. apples, pears, plums, peaches, nectarines, almonds, cherries, papayas, strawberries, raspberries, blackberries or gooseberries; leguminous plants, such as beans, lentils, peas, alfalfa or soybeans; oil plants, such as rapeseed (oilseed rape), turnip rape, mustard, olives, sunflowers, coconut, cocoa beans, castor oil plants, oil palms, ground nuts or soybeans; cucurbits, such as squashes, pumpkins, cucumber or melons; fiber plants, such as cotton, flax, hemp or jute; *Citrus* fruit, such as oranges, lemons, grapefruits or mandarins; vegetables, such as eggplant, spinach, lettuce (e.g. iceberg lettuce), chicory, cabbage, asparagus, cabbages, carrots, onions, garlic, leeks, tomatoes, potatoes, cucurbits or sweet peppers; lauraceous plants, such as avocados, cinnamon or camphor; energy and raw material plants, such as corn, soybean, rapeseed, sugar cane or oil palm; tobacco; nuts, e.g. walnuts; pistachios; coffee; tea; bananas; vines (table grapes and grape juice grape vines); hop; sweet leaf (also called Stevie); natural rubber plants or ornamental and forestry plants, such as flowers (e.g. carnation, petunias, geranium/pelargoniums, pansies and impatiens), shrubs, broad-leaved trees (e.g. poplar) or evergreens, e.g. conifers; eucalyptus; turf; lawn; grass such as grass for animal feed or ornamental uses. Preferred plants include potatoes sugar beets, tobacco, wheat, rye, barley, oats, rice, corn, cotton, soybeans, rapeseed, legumes, sunflowers, coffee or sugar cane; fruits; vines; ornamentals; or vegetables, such as cucumbers, tomatoes, beans or squashes.

The term "plant" is to be understood as including genetically modified plants, which have been modified by either conventional breeding, or mutagenesis or genetic engineering, or by a combination thereof.

Plants, which have been modified by mutagenesis or genetic engineering, and are of particular commercial importance, include alfalfa, rapeseed (e.g. oilseed rape), bean, carnation, chicory, cotton, eggplant, eucalyptus, flax, lentil, maize, melon, papaya, petunia, plum, poplar, potato, rice, soybean, squash, sugar beet, sugarcane, sunflower, sweet pepper, tobacco, tomato, and cereals (e.g. wheat), in particular maize, soybean, cotton, wheat, and rice. In plants, which have been modified by mutagenesis or genetic engineering, one or more genes have been mutagenized or integrated into the genetic material of the plant. The one or more mutagenized or integrated genes are preferably selected from pat, epsps, cry1Ab, bar, cry1Fa2, cry1Ac, cry34Ab1, cry35AB1, cry3A, cryF, cry1F, mcry3a, cry2Ab2, cry3Bb1, cry1A.105, dfr, barnase, vip3Aa20, barstar, als, bxn, bp40, asn1, and ppo5. The mutagenesis or integration of the one or more genes is performed in order to improve certain properties of the plant. Such properties, also known as traits, include abiotic stress tolerance, altered growth/yield, disease resistance, herbicide tolerance, insect resistance, modified product quality, and pollination control. Of these properties, herbicide tolerance, e.g. imidazolinone tolerance, glyphosate tolerance, or glufosinate tolerance, is of particular importance. Several plants have been rendered tolerant to herbicides by mutagenesis, for example Clearfield® oilseed rape being tolerant to imidazolinones, e.g. imazamox. Alternatively, genetic engineering methods have been used to render plants, such as soybean, cotton, corn, beets and oil seed rape, tolerant to herbicides, such as glyphosate and glufosinate, some of which are commercially available under the trade names RoundupReady® (glyphosate) and LibertyLink® (glufosinate). Furthermore, insect resistance is of importance, in particular lepidopteran insect resistance and coleopteran insect resistance. Insect resistance is typically achieved by modifying plants by integrating cry and/or vip genes, which were isolated from *Bacillus thuringiensis* (Bt), and code for the respective Bt toxins. Genetically modified plants with insect resistance are commercially available under trade names including WideStrike®, Bollgard®, Agrisure®, Herculex®, YieldGard®, Genuity®, and Intacta®. Plants may be modified by mutagenesis or genetic engineering either in terms of one property (singular traits) or in terms of a combination of properties (stacked traits). Stacked traits, e.g. the combination of herbicide tolerance and insect resistance, are of increasing importance. In general, all relevant modified plants in connection with singular or stacked traits as well as detailed information as to the mutagenized or integrated genes and the respective events are available from websites of the organizations "International Service for the Acquisition of Agri-biotech Applications (ISAAA)" (http://www.isaaa.org/gmapprovaldatabase) and "Center for Environmental Risk Assessment (CERA)" (http://cera-gmc.org/GMCropDatabase).

The compounds of the invention are suitable for use on any sugarcane, *Citrus*, rapeseed, and potato plants, including those that have been genetically modified to be resistant to active ingredients such as herbicides or to produce biologically active compounds that control infestation by plant pests.

In a further preferred embodiment, transgenic sugarcane, *Citrus*, rapeseed, and potato plants and plant cultivars obtained by genetic engineering methods, if appropriate in combination with conventional methods (Genetically Modified Organisms), and parts thereof, are treated. Particularly preferably, plants of the plant cultivars which are in each case commercially available or in use are treated according to the invention. Plant cultivars are understood as meaning plants having novel properties ("traits") which have been obtained by conventional breeding, by mutagenesis or by recombinant DNA techniques.

These can be cultivars, bio- or genotypes. Depending on the plant species or plant cultivars, their location and growth conditions (soils, climate, vegetation period, diet), the treatment according to the invention may also result in superadditive "synergistic") effects.

Thus, for example, reduced application rates and/or a widening of the activity spectrum and/or an increase in the activity of the substances and compositions which can be used according to the invention, better plant growth, increased tolerance to high or low temperatures, increased tolerance to drought or to water or soil salt content, increased flowering performance, easier harvesting, accelerated maturation, higher harvest yields, higher quality and/or a higher nutritional value of the harvested products, better storage stability and/or processability of the harvested products are possible, which exceed the effects which were actually to be expected.

The preferred transgenic sugarcane, *Citrus*, rapeseed, and potato plants or plant cultivars (obtained by genetic engineering) which are to be treated according to the invention include all plants which, by virtue of the genetic modification, received genetic material which imparts particularly advantageous, useful traits to these plants.

Examples of such traits are better plant growth, increased tolerance to high or low temperatures, increased tolerance to drought or to water or soil salt content, increased flowering performance, easier harvesting, accelerated maturation, higher harvest yields, higher quality and/or a higher nutritional value of the harvested products, better storage stability and/or processability of the harvested products.

Further and particularly emphasized examples of such traits are a better defense of the plants against animal and microbial pests, such as against insects, mites, phytopathogenic fungi, bacteria and/or viruses, and also increased tolerance of the plants to certain herbicidally active compounds.

It has surprisingly been found that the pesticidal activity of the compounds of the invention may be enhanced by the insecticidal trait of a modified plant. Furthermore, it has been found that the compounds of the present invention are suitable for preventing insects to become resistant to the insecticidal trait or for combating pests, which already have become resistant to the insecticidal trait of a modified plant. Moreover, the compounds of the present invention are suitable for combating pests, against which the insecticidal trait is not effective, so that a complementary insecticidal activity can advantageously be used.

The term "plant propagation material" refers to all the generative parts of the plant such as seeds and vegetative plant material such as cuttings and tubers (e.g. potatoes), which can be used for the multiplication of the plant. This includes seeds, roots, fruits, tubers, bulbs, rhizomes, shoots, sprouts and other parts of plants. Seedlings and young plants, which are to be transplanted after germination or after emergence from soil, may also be included. These plant propagation materials may be treated prophylactically with a plant protection compound either at or before planting or transplanting.

The term "seed" embraces seeds and plant propagules of all kinds including but not limited to true seeds, seed pieces, suckers, corms, bulbs, fruit, tubers, grains, cuttings, cut shoots and the like, and means in a preferred embodiment true seeds.

In general, "pesticidally effective amount" means the amount of active ingredient needed to achieve an observable effect on growth, including the effects of necrosis, death, retardation, prevention, and removal, destruction, or otherwise diminishing the occurrence and activity of the target organism. The pesticidally effective amount can vary for the various compounds/compositions used in the invention. A pesticidally effective amount of the compositions will also vary according to the prevailing conditions such as desired pesticidal effect and duration, weather, target species, locus, mode of application, and the like.

In the case of soil treatment, in furrow application or of application to the pests dwelling place or nest, the quantity of active ingredient ranges from 0.0001 to 500 g per 100 m$^2$, preferably from 0.001 to 20 g per 100 m$^2$.

For use in treating crop plants, e.g. by foliar application, the rate of application of the active ingredients of this invention may be in the range of 0.0001 g to 4000 g per hectare, e.g. from 1 g to 2 kg per hectare or from 1 g to 750 g per hectare, desirably from 1 g to 100 g per hectare, more desirably from 10 g to 50 g per hectare, e.g., 10 to 20 g per hectare, 20 to 30 g per hectare, 30 to 40 g per hectare, or 40 to 50 g per hectare.

The compounds of the present invention are also suitable for use in the treatment of seeds in order to protect the seeds from insect pests, in particular from soil-living insect pests, and the resulting seedling's roots and shoots against soil pests and foliar insects. The present invention therefore also relates to a method for the protection of seeds from insects, in particular from soil insects, and of the seedling's roots and shoots from insects, in particular from soil and foliar insects, said method comprising treating the seeds before sowing and/or after pregermination with a compound of the present invention. The protection of the seedling's roots and shoots is preferred. More preferred is the protection of seedling's shoots from piercing and sucking insects, chewing insects and nematodes.

The term "seed treatment" comprises all suitable seed treatment techniques known in the art, such as seed dressing, seed coating, seed dusting, seed soaking, seed pelleting, and in-furrow application methods. Preferably, the seed treatment application of the active compound is carried out by spraying or by dusting the seeds before sowing of the plants and before emergence of the plants.

The present invention also comprises seeds coated with or containing the active compound. The term "coated with and/or containing" generally signifies that the active ingredient is for the most part on the surface of the propagation product at the time of application, although a greater or lesser part of the ingredient may penetrate into the propagation product, depending on the method of application. When the said propagation product is (re)planted, it may absorb the active ingredient.

In addition, the active compound may also be used for the treatment of seeds from plants, which have been modified by mutagenisis or genetic engineering, and which e.g. tolerate the action of herbicides or fungicides or insecticides. Such modified plants have been described in detail above.

The active substance concentrations in ready-to-use formulations, which may be obtained after two-to-tenfold dilution, are preferably from 0.01 to 60% by weight, more preferably from 0.1 to 40% by weight.

In a preferred embodiment a FS formulation is used for seed treatment. Typically, a FS formulation may comprise 1-800 g/l of active ingredient, 1-200 g/l Surfactant, 0 to 200 g/l antifreezing agent, 0 to 400 g/l of binder, 0 to 200 g/l of a pigment and up to 1 liter of a solvent, preferably water.

Especially preferred FS formulations of the compounds of the present invention for seed treatment usually comprise from 0.1 to 80% by weight (1 to 800 g/1) of the active ingredient, from 0.1 to 20% by weight (1 to 200 g/1) of at least one surfactant, e.g. 0.05 to 5% by weight of a wetter and from 0.5 to 15% by weight of a dispersing agent, up to 20% by weight, e.g. from 5 to 20% of an anti-freeze agent, from 0 to 15% by weight, e.g. 1 to 15% by weight of a pigment and/or a dye, from 0 to 40% by weight, e.g. 1 to 40% by weight of a binder (sticker/adhesion agent), optionally up to 5% by weight, e.g. from 0.1 to 5% by weight of a thickener, optionally from 0.1 to 2% of an anti-foam agent, and optionally a preservative such as a biocide, antioxidant or the like, e.g. in an amount from 0.01 to 1% by weight and a filler/vehicle up to 100% by weight.

EXAMPLES

The present invention is now illustrated in further details by the following example, without imposing any limitation thereto.

The compound of formula (I) was prepared by method analogical to the method as disclosed in WO2014/167084.

The compound of formula I-R-1 was prepared by method as described herein in the description.

Analytical data of the compound I (racemic) and I-R-1 are provided in the table below.

| compound | structure | ¹H NMR conditions | ¹H NMR data |
|---|---|---|---|
| Compound (I) | (structure of I) | ¹H-NMR (CDCL3/ppm/ 400 MHz) | 7.72 (s, 1H), 7.65 (d, 2H), 7.32 (t, 2H), 7.16 (t, 1H), 6.47 (d, 1H), 4.1 (dd, 1H), 3.58 (d, 1H), 3.52 (s, 3H) |
| Compound (I-R-1) | (structure of I-R-1) | ¹H NMR (300 MHz, DMSO-d6) | 3.42 (s, 3H), 3.94 (d, J = 12 Hz, 1H), 4.25-4.32 (m, 1H), 6.48 (d, J = 8.1 Hz, 1H), 7.06-7.11 (m, 1H), 7.21-7.26 (m, 2H), 7.6 (d, J = 7.5 Hz, 1H), 7.96 (s, 1H). |

Test compound I-R-1 used in below biological examples is ≥95% enantiomeric excess unless otherwise specified.

1. Potato-Colorado Potato Beetle, *Leptinotarsa decimlineata*:

Foliar application: Field trials were set up. The plots were laid out in 5-meter rows with 4 replications. Applications of Compound I-R-1 was done. Feeding damage assessments were taken at 6, 15 and 20 days after application for the entire plot. Values followed by the same letter within each assessment date are not significantly different (α=0.05) using LSD.

TABLE 2

Efficacy of Compound I-R-1 against Colorado Potato beetle, *Leptinotarsa decimlineata*, as a foliar treatment

| | | Feeding damage (%) | | |
|---|---|---|---|---|
| | Rate | A06 | A15 | A20 |
| check | . | 17.5 a | 15.5 a | 23.75 a |
| Compound I-R-1 | 60 g ai/ha | 6.5 b | 5.0 c | 8.0 b |

Summary: Compound I-R-1 showed good efficacy against *L. decimlineata* as foliar application in terms of reduction in feeding damage (Table 2).

As the mesoionic compounds were also disclosed in WO2014/167084 as pest control agents, below compounds disclosed as C-6 and C-19 in WO2014/167084 were prepared according to methods provided in WO2014/167084.

| Compound | Structure | Characterization 1H-NMR δ(ppm); J (Hz) |
|---|---|---|
| C-6 | (structure of C-6) | DMSO-D6: 7.87 (s, 1 H), 7.60 (d, 2H, J = 7.2), 7.23 (t, 2H, J = 7.6), 7.08 (t, 1 H, J = 7.6), 5.98~5.95 (m, 1 H), 3.67~3.59 (m, 1 H), 3.51~3.44 (m, 1 H), 3.37 (s, 3H), 2.69~2.67 (m, 1 H), 2.60~2.54 (m, 1 H) |

| Compound | Structure | Characterization 1H-NMR δ(ppm); J (Hz) |
|---|---|---|
| C-19 | | 1H-NMR (CDCl3/ppm/400 MHz) 7.71 (s, 1H), 7.53 (d, 2H), 7.42 (t, 2H), 7.34 (t, 1 H), 5.91 (dd, 1H), 4.95 (t, 1 H), 4.81 (dd, 1 H), 3.36 (s, 3H) |

2. Method: Colorado Potato Beetle (CPB, *Leptinotarsa decemlineata*) Dipping Bioassay (Foliar Method) with Potato Plants Serial dilutions of TGAI are made in 50:50 (acetone: H2O) 0.01% kinetic solvent solution. Potato plant true leaves are snipped off the plant, treated by dipping method in a bowl with acetone-resistant plastic liner and inserted into a glass flask filled with water of the stem part to prevent dehydration of the leaves. Leaves are air-dried in hood, and transferred to petri dishes preset with a filter paper soaked with 2.5 ml water. The leaves are infested with five 2nd instar CPB per dish. 6 replicates/treatment and one rate (100 ppm)/test analog. Petri dishes are held for 5 days after infest at a 250 C, 50% RH and 14/10 light/dark cycle in walk-in chamber. Both plant feeding damage and mortality of CPB were evaluated.

Results

From following tables, all indicated that both C-6 and C-19 at 100 ppm were inactive against CPB by potato plant dipping assay. Both Compound I and compound I-R-1 at 100 ppm were active.

TABLE 7

Mortality of CPB (%)

| Compound | Dose (ppm) | Mortality (%) | Control corrected |
|---|---|---|---|
| C-6 | 100 | 0.00 | 0.00 |
| C-19 | 100 | 3.33 | 3.33 |
| Compound (I) | 100 | 56.67 | 56.67 |
| Compound (I-R-1) | 100 | 80.00 | 80.00 |
| solvent | 0 | 0.00 | 0.00 |

TABLE 8

Feeding damage protection of potato plants (%)

| Compound | Dose (ppm) | Feeding Protection (%) | Control corrected |
|---|---|---|---|
| C-6 | 100 | 11.67 | 7.00 |
| C-19 | 100 | 5.00 | 0.00 |
| Compound (I) | 100 | 89.17 | 88.60 |
| Compound (I-R-1) | 100 | 90.83 | 90.40 |
| solvent | 0 | 5.00 | 0.00 |

The invention claimed is:

1. A method for controlling or combating pest invertebrates of potato plants, infestation, or for controlling or combating infection by invertebrate potato pests in potato plants, comprising contacting the potato plant, parts of it, its propagation material, plant locus, the invertebrate potato pests, their food supply, habitat, or breeding grounds with pesticidally effective amount of a compound of formula I

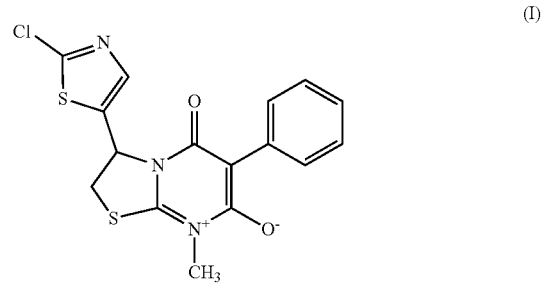 [SMILES: C[n+]1c([O-])c(-c2ccccc2)c(=O)n2c1SCC2c1cnc(Cl)s1]

(I)

which is with enantiomeric excess of compound I-R-1

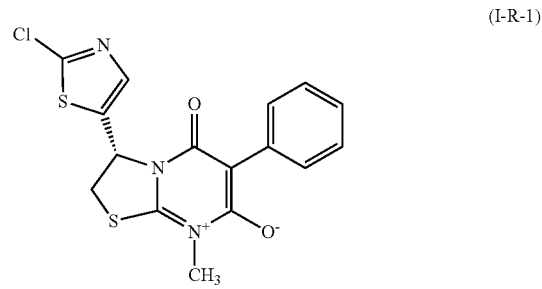 [SMILES: C[n+]1c([O-])c(-c2ccccc2)c(=O)n2c1SC[C@@H]2c1cnc(Cl)s1]

(I-R-1)

or tautomers or salts thereof.

2. The method according to claim 1, wherein the compound of formula I is with at least 90% enantiomeric excess of the compound I-R-1.

3. The method according to claim 1, wherein the compound of formula I is the compound I-R-1.

4. A method for controlling pest invertebrates of potato plants, comprising contacting the potato plant, parts of it, its propagation material, the pests, their food supply, habitat or breeding grounds with composition comprising a compound of formula I as defined in claim 1 and one or more other mixing partners selected from pesticidally active compounds, in a weight ratio from 10000:1 to 1:10000.

5. A method for protecting potato plants or potato plant propagation material from the attack or infestation by invertebrate potato pests, comprising contacting the potato plant, parts of it, its propagation material, plant locus, the pests, their food supply, habitat, or breeding grounds with pesticidally effective amount of the compound of formula I as defined in claim 1.

6. The method according to claim 1, wherein the compound of formula I is applied by foliar or drench method.

7. The method according to claim 1, wherein the compound of formula I is applied by foliar method.

8. The method according to claim 1, wherein the compound of formula I is applied by drench method.

9. The method according to claim 1, wherein the invertebrate pests are selected from the group consisting of Elateridae, *Amrasca biguttula biguttula, Acizzia solanicola, Agriotes lineatus, Agriotes obscurus, Agrotis ipsilon, Amphimallon solstitialis, Amrasca devastans, Aphis fabae, Aphis frangulae, Aphis gossypii, Aphis nasturtii, Aphis spiraecola, Aulacorthum circumflexum, Aulacorthum solani, Autographa californica, Bactericera nigricornis, Bactericera cockerelli, Bemisia argentifolii, Circulifer tennelus, Diabrotica speciosa, Empoasca devastans, Empoasca fabae, Epitrix* spp., *Heliothis zea, Henosepilachna vigintioctomaculata, Heterodera* spp., *Holotrichia oblita, Leptinotarsa decemlineata, Limonius canus, Limonius californicus, Ctenicera pruinina, Liriomyza* spp, *Macrosiphum euphorbiae, Macrosteles fascifrons, Meloidogyne hapla, Meloidogyne chitwoodi, M. incognita, Monomorium pharaonic, Myzus ascalonicus, Myzus ornatus, Pemphigus* sp., *Peridroma saucia, Phthorimaea operculella, Phthorimaea* spp, *Pratylenchus penetrans, P. neglectus, Paratrichodorus* sp., *Pseudoplusia includens, Rhopalosiphoninus latysiphon, Rhopalosiphum rufiabdominalis, Russelliana solanicola* Tuthill, *Smynthurodes betae, Spodoptera eridania, Spodoptera frugiperda*, and *Spodoptera litura*.

10. The method according to claim 1 wherein the potato plant is a genetically modified plant.

11. The method according to claim 1, wherein the compound of formula I is with at least 98% enantiomeric excess of compound I-R-1.

\* \* \* \* \*